US008896559B2

(12) United States Patent
Goldbaum

(10) Patent No.: US 8,896,559 B2
(45) Date of Patent: Nov. 25, 2014

(54) WIRE-ARRAY PRESSURE AND MOVEMENT SENSOR

(71) Applicant: Harold J. Goldbaum, Vero Beach, FL (US)

(72) Inventor: Harold J. Goldbaum, Vero Beach, FL (US)

(*) Notice: Subject to any disclaimer, the term of this patent is extended or adjusted under 35 U.S.C. 154(b) by 0 days.

(21) Appl. No.: 13/669,391

(22) Filed: Nov. 5, 2012

(65) Prior Publication Data

US 2014/0043254 A1 Feb. 13, 2014

Related U.S. Application Data

(60) Provisional application No. 61/555,906, filed on Nov. 4, 2011.

(51) Int. Cl.
*G06F 3/041* (2006.01)
(52) U.S. Cl.
USPC ......... 345/173; 345/174; 178/18.06; 200/515
(58) Field of Classification Search
CPC ....... G06F 3/041; G06F 3/0414; G06F 3/044; G06F 3/045; G06F 3/047; H04K 1/00
USPC .......................................... 345/173; 702/139
See application file for complete search history.

(56) References Cited

U.S. PATENT DOCUMENTS

| 7,656,386 | B1 | 2/2010 | Goldbaum |
| 8,006,565 | B2 | 8/2011 | Wu et al. |
| 2008/0158171 | A1* | 7/2008 | Wong et al. ............... 345/173 |
| 2010/0188345 | A1* | 7/2010 | Keskin et al. ............. 345/173 |
| 2011/0248941 | A1* | 10/2011 | Abdo et al. ............... 345/173 |
| 2012/0038583 | A1* | 2/2012 | Westhues et al. ......... 345/174 |

* cited by examiner

*Primary Examiner* — Gerald Johnson
(74) *Attorney, Agent, or Firm* — Allen D. Hertz, P.A.; Allen D. Hertz

(57) ABSTRACT

A multilayer wire array having an upper layer having a series wires arranged in an equally spaced, parallel relationship and a series of internal layers located in a spatial arrangement below the upper layer. Each internal layer is similar to the upper layer, wherein each internal layer is oriented preferably perpendicularly to the adjacent layers. The upper layer is provided in electrical connectivity with a power source. Each subsequent layer is provided in electrical communication with a sensing device. Pressure is applied to the wire array, wherein the pressure distorts the layers causing electrical communication between contacting wires. The connectivity provides an output that is sensed by the sensing device and subsequently analyzed to determine the location and any respective movement of the pressure applied to the array. The output data can be used as a pointing device for a computer, a user identity device, and a security device.

20 Claims, 7 Drawing Sheets

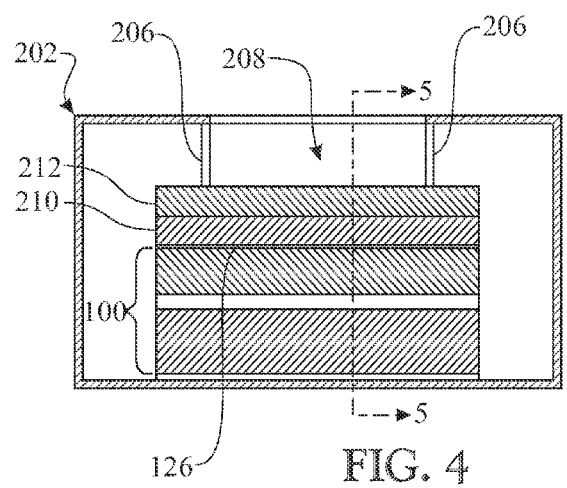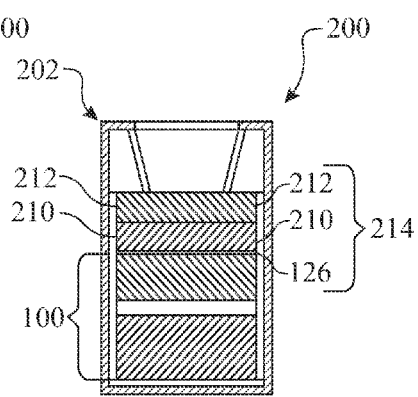
FIG. 4   FIG. 5
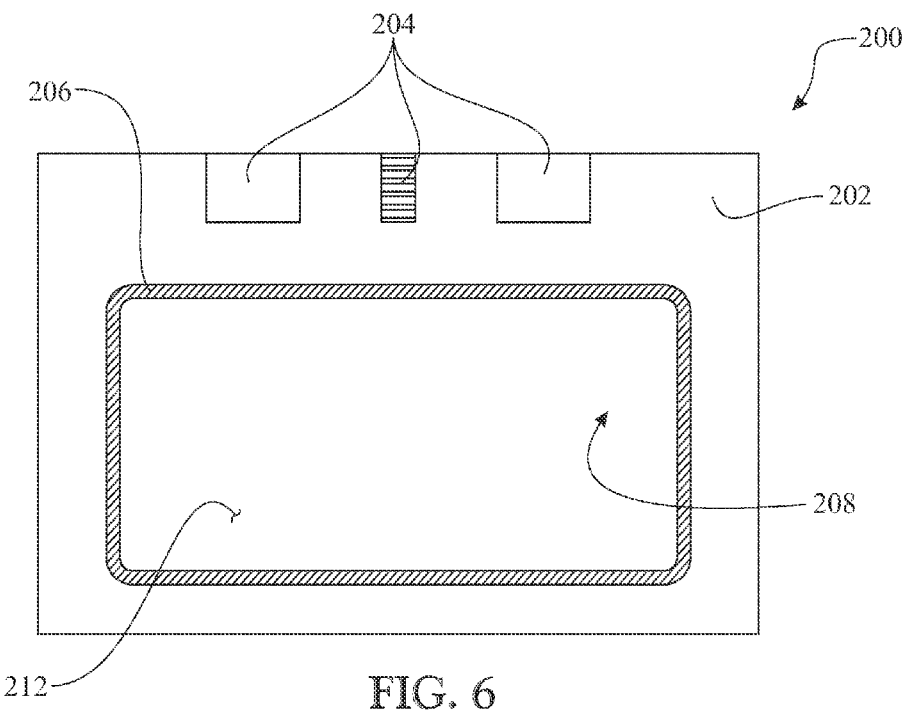
FIG. 6

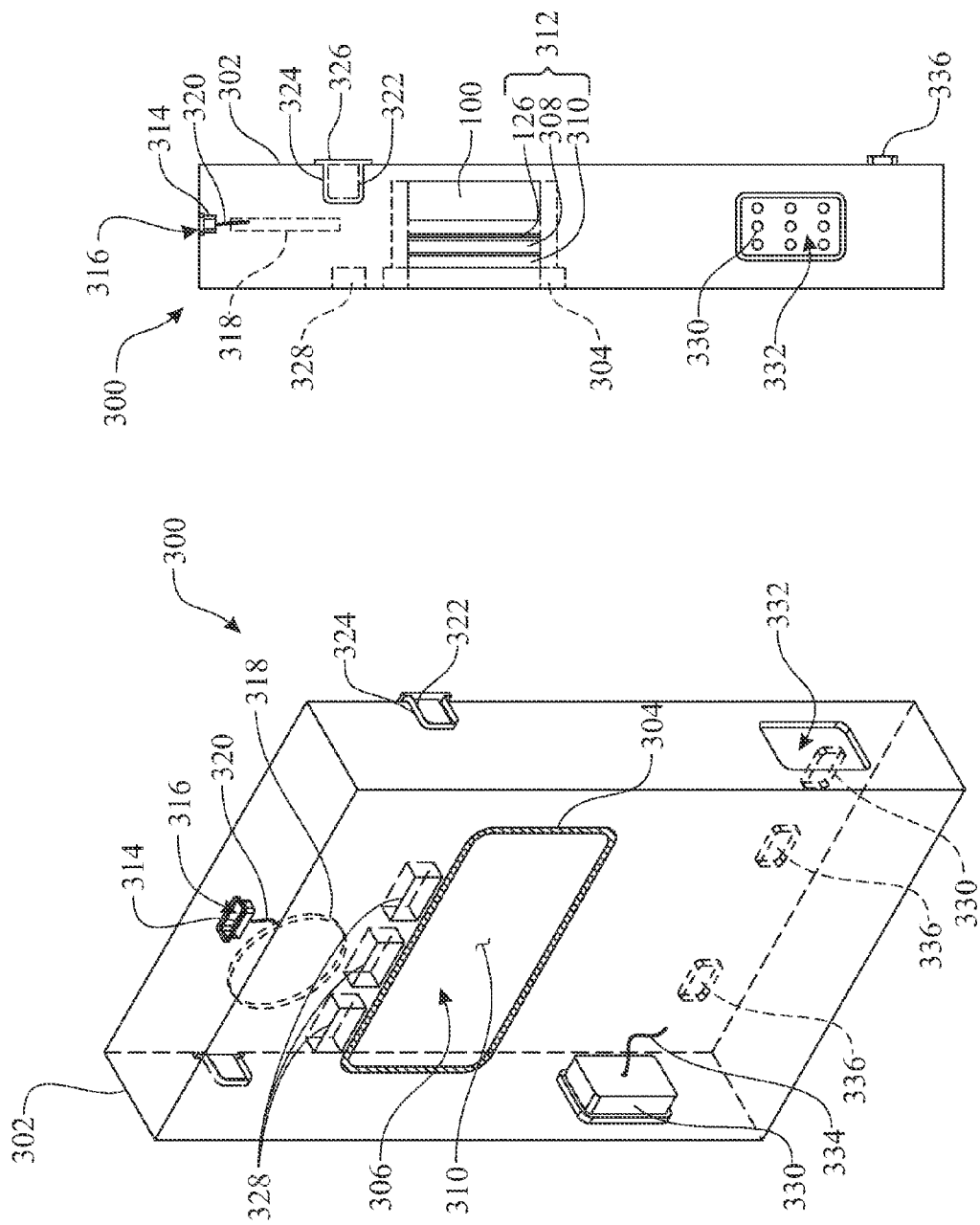

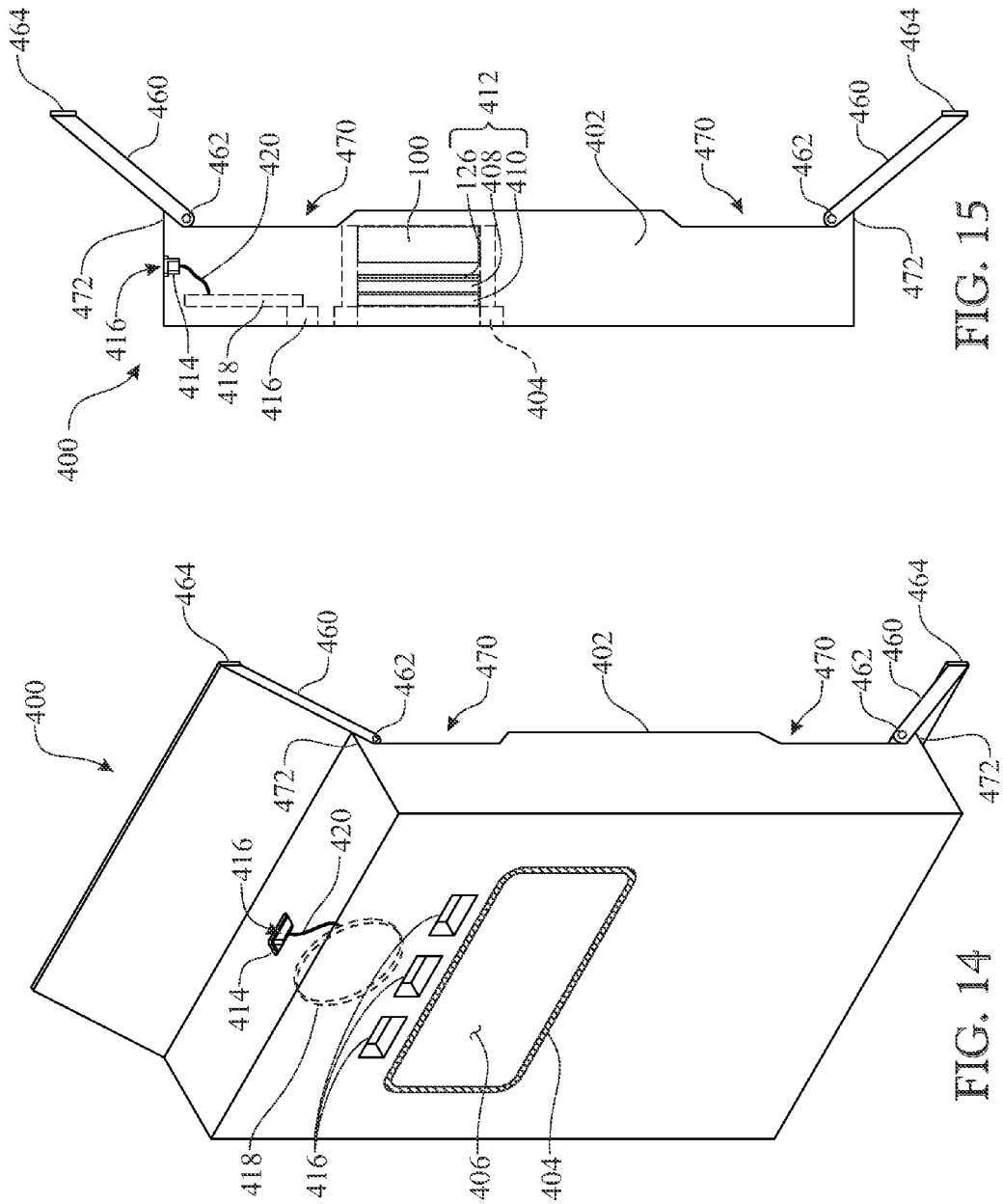

WIRE-ARRAY PRESSURE AND MOVEMENT SENSOR

CROSS REFERENCE TO RELATED APPLICATIONS

This U.S. Non-Provisional Patent Application claims the benefit of U.S. Provisional Patent Application Ser. No. 61/555,906, filed on Nov. 4, 2011, which is incorporated in its entirety herein by reference.

FIELD OF THE INVENTION

The present invention relates to a pressure sensor utilizing an array of wires, and more specifically, the array of wires comprising a series of layers, each layer having a plurality of wire segments configured in a substantially parallel arrangement, the array being capable of determining both "X" and "Y" coordinates as well as pressure applied to a user interface.

BACKGROUND OF THE INVENTION

There are many types of pressure sensors that exist in many forms in current art; they generally measure the pressure of air or liquids. Those of which are flat generally rely on a plurality of piezoelectric resistive elements assembled into an array. The number and density of the piezoelectric resistive elements required is defined by the lateral sensitivity desired. The cost is a direct relation to the number and density of the piezoelectric resistive elements, where the greater the number and higher the density, the greater the manufacturing cost. Further, while most will register a static pressure and the movement in the device's plane, few are capable of registering the pressure and variation thereof at any point in the plane. Those configurations having this capability are significantly more expensive.

Electronic input or input/output devices exist in many forms in current art. These can include keyboards, pointing devices, and the like. A pointing device is a device that serves to move a cursor upon a computer's screen and to perform other programmed functions on the screen and in the computing device to which it is electronically interfaced. The most ubiquitous of the many configurations of the pointing device is a desktop touchpad comprising a motion-sensing device on a bottom portion thereof. The detachable computer touchpad is moved along a planar supporting surface, wherein the movement is translated into movement and positioning of a cursor or other location reference on the computing device.

Another embodiment of a user entry device is a trackball, wherein the user rotates a ball extending upward from an upper surface of the trackball assembly to provide movement and positioning of the cursor or other location reference on the computing device.

User identity devices exist in many forms in current art. Examples include touchpad's (alternatively referred to as trackpad's), tablet entry devices, signature pads, fingerprint readers, and the like. Signature recognition devices identify the individual based upon graphic analysis of a signature. Fingerprint readers or other biometric recognition devices identify the individual based upon a respective biometric identification.

Portable computers were conceived to be used on a user's laptop, hence the name laptop computers. During their initial development, the concept was to utilize the device in any environment, wherein the device would include a user entry device that would be independent of the working environment. To address an environment exclusive of a planar working surface, laptop computing devices originally including a trackball style user entry device for positioning the curser. The user entry device eventually evolved into a planar capacitive entry device or a thermal entry device, which has become the standard of currently available laptop computing devices.

Use of the touchpad requires repetitive finger movement, leading to a somewhat difficult manner of use. In addition, should the user's finger be slightly moist, the performance of the sensors in the pad is degraded. The touchpad is normally located in the center front portion of the keyboard. While this placement accommodates both right-handed and left-handed users, this compromise position is not particularly comfortable for either to use, since most touchpad users are accustomed to having the mouse located on a particular side of the keyboard based on whether they are right-handed or left-handed. Thus, users of notebook computers who find the touchpad's bothersome and inefficient resort to the use of an external user input device, such as a mouse, a trackball, and the like, even though its volume is cumbersome with relation to the size of the computer. Manufacturers of mice have reacted to his situation by developing smaller desktop mice and, while these mice have somewhat alleviated the problem of size, not only is the user still required to carry a separate piece of equipment, but also a flat space may not be available, forcing the user to use the bothersome touchpad.

A desktop mouse is typically grasped in the palm of the hand in such manner that the user's fingers may access the control buttons. It is now known that many users of current art desktop mice may develop a medical problem from such grasping, which may lead to physical discomfort, carpal tunnel syndrome, or other repetitive motion injuries. These problems have led to the introduction of different input devices, for example: (1) ergonomic mice, which strive to alleviate the "grasping" problem; (2) a flat wireless computer touchpad, which is capable of being stored in the PC Card slot of a notebook computer, but which is not fully functional. Goldbaum, in U.S. Pat. No. 7,656,386, discloses a fully functional low profile pointing device having a slideable plate, which appears to resolve the problems associated with use of the touchpad for laptop computers and the "grasping" problem associated with mice used in conjunction with desktop computers. However, that device comprises many moving parts and is mechanically complex; it is thus prone to defects, wear and failure of such parts, and is also prone to being fouled by dirt and dust. Not only is the presently disclosed input/output device a significant improvement over that device as a computer mouse, but it is also programmable as a user identity device, a capability that was neither described nor claimed in the '386 reference.

Losses to credit card companies due to fraudulent use at the point of sale with lost or stolen credit card are estimated to represent billion dollar amounts yearly, which could be eliminated by the use of one of the variants of the presently disclosed device. Use of a credit card when making purchases on the Internet is particularly prone to fraud. Credit card loss due to fraudulent internet usage of stolen or lost credit cards, or the details thereof, is estimated to be in the hundreds of millions of dollars yearly and these losses also could be eliminated by the use of one of the variants of the presently disclosed device.

A signature pad and its relation, the signature recognition pad, are other types of such devices. The signature pad is generally used at retail locations; it is a device onto which a credit card holder signs his or her name to accept the charge, and into which a debit card holder enters a Personal Identification Number (PIN). Both signature pads and signature recognition pads are apparatus having a liquid crystal display (LCD) interface or the like configured on a pressure pad having a transparent hard surface, onto which a user inscribes his or her signature with a tethered stylus. The stylus, acting upon the pad, applies a precisely directed pressure to the device, and the user's signature appears on an LCD interface or the like as the user signs. A signature pad does not verify the signature of the person signing. As there is no verification of the signature, there is no assurance that the signer is the authorized user of the credit card. In some retail establishments where there is no signature pad, the purchaser signs a slip of paper accepting the charge but, again, there is no assurance that the person signing is in fact the owner of account associated with the financial card. When one pays with a debit card, the user must enter a PIN identifying that person as the authorized user. However there is no assurance that the user is, in fact, an authorized user; the PIN may have become known to a person who stole the debit card, and obtained knowledge of the PIN.

In an enhanced embodiment, the signature recognition pad can be integrated into a system that verifies the authenticity of the user's signature through a link to a database. A user first establishes his or her authorized signature by signing multiple times at an authorized location. A sophisticated graphic and dynamic software program transforms that signature into an associated algorithm based upon numerous elements of the signature, and that associated algorithm is stored in a secure database to be used for comparison purposes when a signature is submitted for verification. Thereafter, the verification of a signature is performed by a sophisticated graphic pattern analysis program, which also incorporates such dynamic elements as the total time to execute the signature, the time interval between certain events of the signature, and the like. While the verification error rate of these programs is very low, and the ability of these programs to recognize signatures is constantly improving, the system is not error free. In this age of global business, communications and electronic documents, signature recognition devices are extremely important, and a verification error could be extremely costly.

Another known user identification apparatus is a numeric user identity device, typically a keypad, a combination lock, and the like. These are generally numeric or alphanumeric input devices, that control entry to space, a location, a premises or a safe by requiring a user wishing to gain entry thereto, to enter a series of pre-assigned symbols, generally numbers, letters, or a combination thereof, in a pre-assigned order, hereinafter referred to as an authorized user template, into the security access controlled device. Depending upon the level of security desired, the input code series can vary from a small number of characters to a large number of characters. To use a numeric or alphanumeric keypad, keys must be depressed. Most safes still use rotary combination locks, wherein the user enters the input code series by means of rotating a dial, right and left, to pre-assigned numbers in a pre-assigned sequence of rotations.

Though such devices obviously do provide a certain level of security, it is obvious that a high level of security requires longer coded series. The longer the code, the higher the level of difficulty for the user to remember. While shorter series are easier to commit to memory, they are easier to defeat by an unauthorized user. As the level of difficulty increases, the likelihood that the user would record the security code in a manner other than memory also increases. This would include recording the security code in written format, in digital format, and the like.

Further, an unauthorized user may gain access to the input code series by surreptitious observation of the authorized user's entry of the input code series, or by other known and quite accessible means. Combination safes have a limited security level and are known to be easily defeated by a technology equipped unauthorized user. Since the security portion of the combination safe is not computerized, the security portion generally does not limit to the number of attempts for entering the access code. The shortcomings of the above identified access control devices have led to the development of biometric sensors for higher security applications. Biometric devices, such as iris scanners, fingerprint scanners, voice recognition devices, and the like have been employed to provide security to a variety of applications, including physical access to rooms, safes, computers, and the like. These are rather expensive devices and, while their error rate is very low, they also have their shortcomings.

Thus, what is desired is an apparatus for ensuring safe access to a computing device, wherein the apparatus is of a low cost feasible for integration into consumer electronic devices, such as portable computers.

SUMMARY OF THE INVENTION

The invention disclosed herein is a pressure sensor capable not only of sensing pressure and the variations thereof on the device, but also the lateral movement thereof in "X" and "Y" coordinates. The pressure sensor enables a planar, fully functional electronic input/output device that exists in at least two embodiments: (1) a touchpad for computers and the like and (2) a user identity device. Each embodiment has a number of variants, and all embodiments and variants include the pressure sensor array disclosed herein.

The presently disclosed device is simple yet effective. It enables an electronic input/output device, configured as a flat but fully functional computer touchpad, which is also an inviolable user identity device.

In some embodiments, the wire pressure sensor array may include:

an array housing comprising a housing base member having a peripheral edge thereof and a series of housing sidewall members contiguous about the peripheral edge of the housing base member and extending upward therefrom forming an interior volume and a flexible upper housing segment spanning across an upper continuous edge formed by the series of housing sidewall members;

a first plurality of segments of electrically conductive wires, the segments of wires spatially arranged parallel to one another forming a first plane of wires, the first plane of wires being located proximate and parallel to the flexible upper housing segment, each electrically conductive wire of the first plurality of segments of electrically conductive wires being individually identified;

a second plurality of segments of electrically conductive wires, the segments of wires spatially arranged parallel to one another forming a second plane of wires, each electrically conductive wire of the second plurality of segments of electrically conductive wires being individually identified;

wherein the second plane of wires is spatially arranged parallel and below the first plane of wires and the wires of the first plane are nonparallel to the wires of the second plane;

ends of the wires of the first plane of wires are connected to a power source;

ends of the wires of the second plane of wires are connected to a read out module;

wherein in operation, a pressure is applied to a flexible upper housing segment causing the flexible upper housing segment to deflect, the deflection of the flexible upper housing segment deflects a portion of the first plurality of segments of electrically conductive wires of the first plane of wires causing contact between the portion of the first plurality of segments of electrically conductive wires of the first plane and a portion of the second plurality of segments of electrically conductive wires of the second plane, wherein the contact creates an electrical circuit identified by software associated with the read out module, and the software determines each of the locations of contact between the portion of the first plurality of segments of electrically conductive wires of the first plane and a portion of the second plurality of segments of electrically conductive wires of the second plane and provides at least one "X" and "Y" coordinate associated with the contact.

In a second aspect, the wire pressure sensor array comprises a series of wires having a rectangular cross sectional shape.

In another aspect, the wire pressure sensor array further comprises additional planes formed by an additional plurality of segments of electrically conductive wires.

In another aspect, the wire pressure sensor array further comprises a volume of semi viscous non-conducting non-adherent liquid contained within the array housing.

In another aspect, the wires of the first plane are substantially perpendicular to the wires of the second plane.

In another aspect, the segments of wires of one plane are substantially perpendicular to the segments of wires of an adjacently located plane.

In another aspect, the cross sectional shape and size of wires associated with a first oriented layer different from at least one of a size and shape of wires associated with a second oriented layer. The size and shape would preferably be designed respective to a length and designed deflection under pressure for each wire segment.

In another aspect, the wire pressure sensor array is integrated into a computer touchpad providing functionality of a computer supporting pointing device.

In another aspect, the computer touchpad further comprises a touchpad cavity providing accessing to the flexible upper housing segment, an interface for communicating with computing device, and at least one touchpad function control user entry element.

In another aspect, the computer touchpad further can be provided in any of three configurations: (1) an integrated computer touchpad, (2) a detachable computer touchpad for use with either a laptop or desktop, and (3) a convertible detachable computer touchpad for use with either a laptop or desktop.

In another aspect, the integrated computer touchpad is integrated into a keyboard section of a portable computer.

In another aspect, the detachable computer touchpad comprises a signal attachment interface capable of positioning the touchpad in a location suitable for either left-handed users and/or right-handed users. The touchpad can include a signal attachment interface on each of a left side and a right side of the housing.

In another aspect, the enhanced detachable computer touchpad comprises a pair of pivotally coupled leg members that rotate between a stored, low profile configuration and a deployed, raised configuration.

In another aspect, the signal attachment interface can include a cable, wherein the cable is retracted via a spring-loaded cable retracting mechanism.

In another aspect, the detachable computer touchpad comprises a slideable slat.

In another aspect, the slideable slat is configured having at least two segments, wherein each of the segments is pivotally coupled to an adjacent segment.

In another aspect, each segment of the slideable slat further comprises a nonskid material disposed upon a contacting surface thereof.

In another aspect, the slideable slat is configured having three segments, wherein each of two end segments are pivotally coupled to a centrally located segment.

In another aspect, the wire pressure sensor array can be utilized as a user identity device (UID) to verify an identity of an individual.

In another aspect, the user identity device (UID) can be implemented to validate a signature. The validation process can include analysis of the graphical image as well as the pressure applied during the signature process.

In another aspect, the user identity device (UID) can be implemented to validate a fingertip arrangement.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 4 presents a sectioned side view of the wire array integrated into an exemplary integrated computer touchpad assembly for use with portable computers wherein the housing of the computer touchpad is shown sectioned therethrough;

FIG. 5 presents a sectioned end view of the integrated computer touchpad originally introduced in FIG. 4, wherein the section is taken along section line 5-5 of FIG. 4;

FIG. 6 presents a top view of the exemplary integrated computer touchpad originally introduced in FIG. 4;

FIG. 7 presents an isometric view of an exemplary detachable computer touchpad for use with desktop and/or portable computers;

FIG. 8 presents a side view of the detachable computer touchpad originally introduced in FIG. 7;

Figure 1:
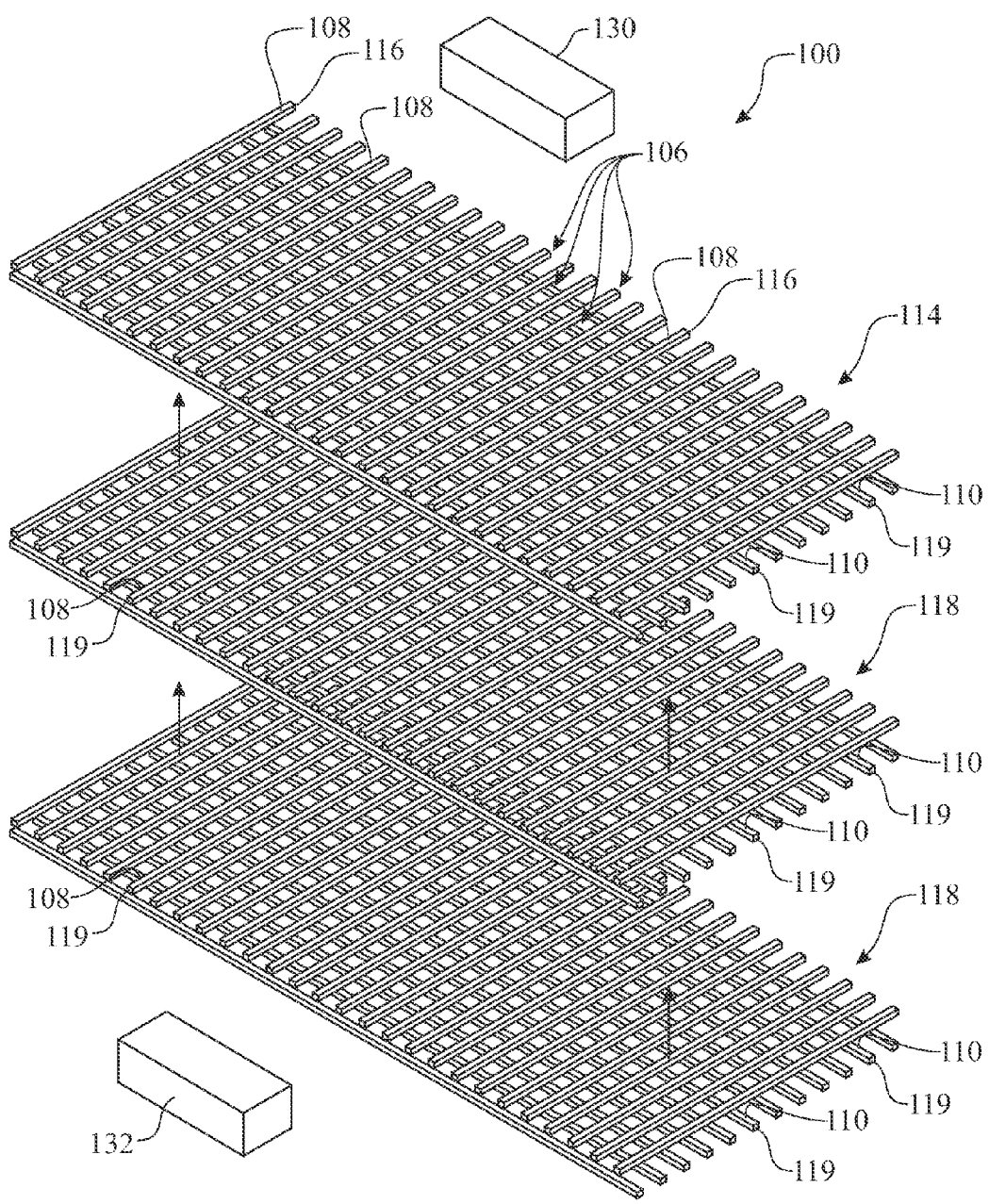
FIG. 1 presents an exploded isometric assembly view of a wire multilayer wire grid pattern, referred to as a wire array.

10, illustrating a slideable slat in an extracted position on the side of a portable or laptop computer;

FIG. 14 presents an isometric view of an exemplary desktop computer touchpad; and FIG. 15 presents a side view of the desktop computer touchpad introduced in FIG. 14.

Like reference numerals refer to like parts throughout the various views of the drawings.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
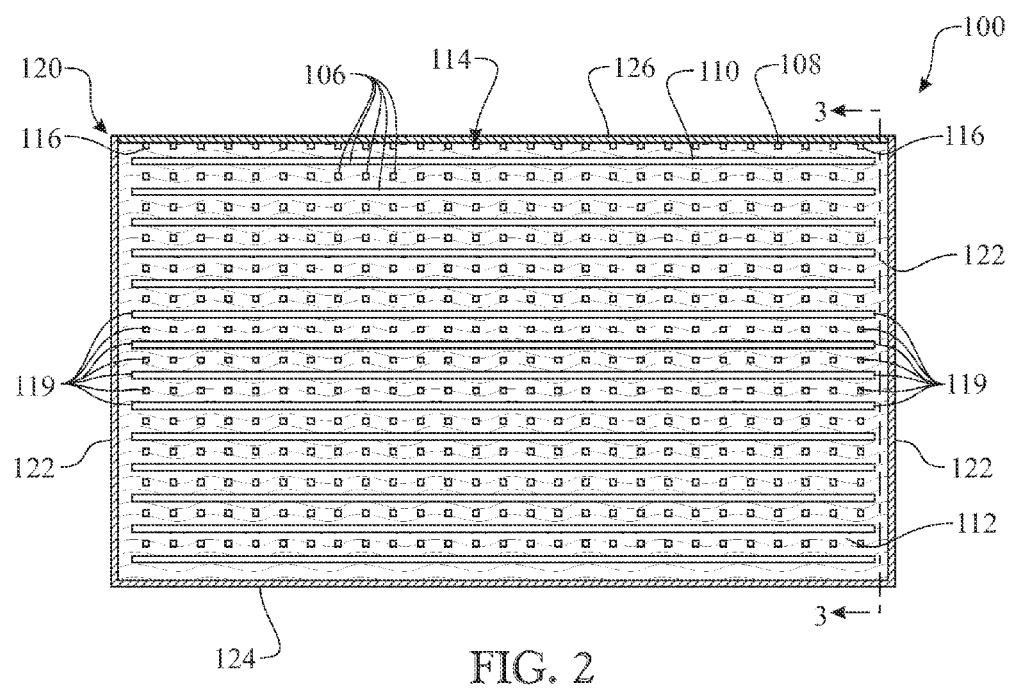
FIG. 2 presents a side elevation view of the assembled wire array shown being integrated within an enclosure, wherein the enclosure is shown sectioned therethrough.
Figure 3:
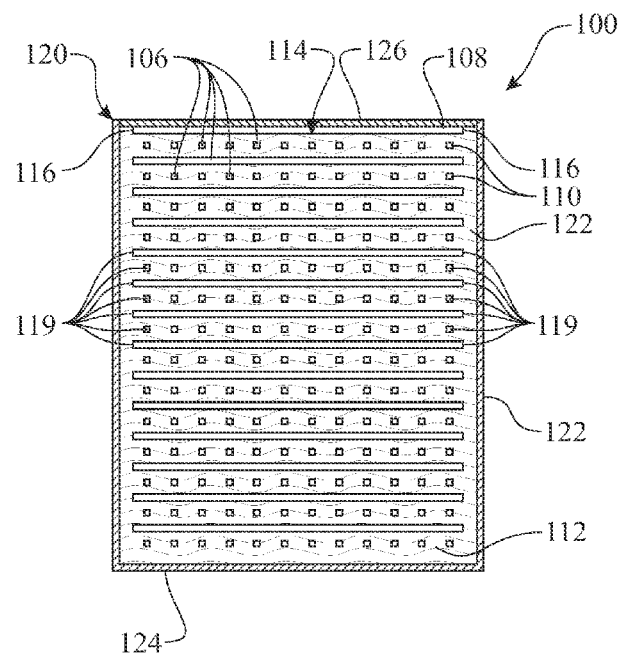
FIG. 3 presents a sectioned end elevation view of the wire array, wherein the section is taken along section line 3-3 of FIG. 2.

A wire pressure sensor array 100 is detailed in the illustrations presented in FIGS. 1 through 3. Each of the rectangular cross-sectioned wires 106 is arranged in a taught manner and spatially arranged respective to adjacent rectangular cross-sectioned wires 106. The rectangular cross-sectioned wires 106 are preferably arranged in two distinct orientations: a first series of rectangular cross-sectioned wires 106 placed in a parallel, preferably equally spaced arranged arrangement forming columns 108 and a second series of rectangular cross-sectioned wires 106 placed in a parallel, preferably equally spaced arranged arrangement forming rows 110. Each arrangement of columns 108 forms a first oriented layer of wires and respective arrangement of rows 110 forms a second oriented layer of wires, wherein the layer adjacent a contacting surface of an assembly is referred to as an uppermost layer 114 and each subsequent lower layer is referred to as an internal layer 118. Although the uppermost layer 114 is illustrated as a column 108, it is understood that the uppermost layer 114 can be a row 110.

The series of layers 114, 118 are assembled within a housing 120. The housing 120 would be preferably formed having a parallelepiped-shape. The a parallelepiped-shaped housing 120 comprises a housing base member 124 having a peripheral edge thereof and a series of housing sidewall members 122 contiguous about the peripheral edge of the housing base member 124 and extending upward therefrom forming an interior volume. A flexible upper housing segment 126 is assembled to the parallelepiped-shaped housing 120 spanning across an upper continuous edge formed by the series of housing sidewall members 122 and located opposite the housing base member 124. A semi-viscous non-conducting non-adherent liquid 112 is optionally placed within the housing interior volume. The wire pressure-sensor array 100 is inserted into the semi-viscous non-conducting non-adherent liquid 112 contained within the housing interior volume. The optional semi-viscous non-conducting non-adherent liquid 112 provides a dampener between the rectangular cross-sectioned wires 106 supporting the rectangular cross-sectioned wires 106 in position until subjected to a compressive force.

The wire pressure-sensor array 100 is provided in an electrical circuit having each end 116 of each rectangular cross-section wire 106 of the uppermost layer 114 provided in electrical communication with a with a power source 130 and each end 119 of each of each rectangular cross-section wire 106 of the internal layers 118 provided in electrical communication with a read out module 132. Passageways 128 are provided within the housing 120 to accommodate electrical interfaces providing electrical communication between the wire pressure-sensor array 100 and the power source 130 and the read out module 132.

In operation, when pressure is applied to the flexible upper housing segment 126, the pressure compresses the uppermost layer 114 causing the rectangular cross-sectioned wires 106 of the uppermost layer 114 to contact the rectangular cross-sectioned wires 106 of the adjacent internal layer 118. It is understood that the deformation of the layers 114, 118 increases proportionally with an increase of pressure applied to the flexible upper housing segment 126. As the deformation of layers 114, 118 increases, the depth of layers contacting one another also increases proportionally. The contact created between the various rectangular cross-sectioned wires 106 of the affected layers 114, 118 creates an electrical circuit between the power source 130 and the read out module 132. Each of the wires of the internal layers 118 is normally in an electrically open (non-conductive) state. Upon connectivity, directly or indirectly, with an upper layer, the respective electrically connected rectangular cross-sectioned wires 106 provide an associated output to the read out module 132. A computing device to determine the respective contact location subsequently analyzes the resulting connectivity. Changes in the electrical conductivity are used to determine motion across the flexible upper housing segment 126.

The wire-array pressure sensor of the present disclosure enables a planar, user electronic input-output device, which can be utilized for two applications: (1) a pointing device (commonly referred to as a mouse or touchpad) embodiment that is described herein in three exemplary configurations, and (2) a user identity device embodiment. All embodiments of the touchpad embodiment are flat and fully functional, operable by pressure applied during movement of a finger. A first exemplary is the integrated computer touchpad 200 that replaces the currently known touchpad integrated into today's portable computers. A second exemplary embodiment is a detachable computer touchpad 300, which enables electrical coupling with a USB port on either side of a portable computer, such that it may be utilized in either a right-handed user configuration or a left-handed user configuration. A third exemplary embodiment is a detachable computer touchpad 400, which is directed for use with a desktop computer. Another embodiment is programmed as a user identity device. While all touchpad embodiments are also programmed as a user identity device, user identity devices are not programmed as mice. A user identity device embodiment exists in a number of variants, all of which perform all of the functions of a current art (a) a signature pad and/or signature-recognition pad, onto which a user signs his or her name; (b)

a biometric recognition device utilizing the user's fingertips as the input and; (c) a numeric pad device, into which an alpha, numeric or alphanumeric series of symbols is selected in a certain order.

The user identity device embodiment exists in a number of configurations which, in current art are separate devices (as previously described) but, in the present disclosure, all of which devices are one and are programmed to function as a: (1) signature-recognition pad (which supersedes the current-art signature pad and signature-recognition pad; (2) fingertip biometric identity device; and (3) security-access control device, which supersedes current devices such as numeric pads, combination locks and access control pads.

As a signature recognition device, the input to the software authentication program of the present disclosure is not a graphic pattern of a signature subject to interpretation and error, but an algorithm generated by a multivariate, multidimensional input based upon the authorized user's signature. In use, an instruction to sign, and a line on which to sign, would appear on the thin-film liquid-crystal display (TFT-LCD) interface 210 or the like. The user would simply inscribe his or her signature, wherein the signature is transformed into an algorithm by a central processing unit of the computing device, which algorithm is transmitted to a secure server, for verification. The numbers of parameters available for computation is such, and the method of use is such, that it can be asserted that the device, properly used, would eliminate virtually any possibility of error.

As a biometric identity device, the input to the software authentication program of the present disclosure is the authorized user's fingertips. In use, a rectangle would appear on the TFT-LCD interface 210 or the like and the user would simply place the number of fingertips of the hand selected as the authorized user template in the rectangle, and press down normally. The set of fingertips is transformed into an algorithm by the device's CPU (as described hereinafter), which algorithm is transmitted (as described hereinafter) to a secure server, for verification. As described hereinafter, this user template is inviolate.

As a security access control device, the input to the software authentication program of the present disclosure is the authorized user's predefined alpha, numeric or alphanumeric symbols in a certain order. In use, a number of the-such would appear on the TFT-LCD interface 210 or the like, from which the user would select those which had been defined as the authorized user's template.

It is understood that a transition between current technology and the stand-alone user identity device would require time and an investment in equipping retail establishments with the new device. During the transition period, current-art procedures could be followed, and the user identity devices disclosed herein would accept credit and debit cards in the current-art manner. The investment would certainly be worthwhile, as the use of the user identity device disclosed herein would eliminate the losses mentioned above. Further still, this could be the occasion for the transition to the new intelligent type cards.

As to the cost of equipping a private user with either a touchpad of the present disclosure (which is also a user identity device), or a private-use stand alone user identity device, there could be a cost sharing arrangement with credit card issuers, as it is in their interest to stem credit card losses as could be the case if credit or debit card holds utilized user identity device described herein.

Description of the Physical Configuration and the Functioning of the Disclosure

All variants and embodiments of the planar electronic user input/output device of the present disclosure include the herein described pressure sensor array 100 as a common internal component. While the external form, configuration and programming as well as the electronic interface may vary according to the variant and embodiment, the manner in which the said array functions is the same in all the aforesaid variants and embodiments.

The pressure sensor array 100 (which can be referred to as a grid, a matrix, a grating, or a mesh) of wires 106 preferably is enclosed in a sealed parallelepiped-shaped housing 120. The housing 120 is preferably fabricated of plastic. The rectangular cross-sectioned wires 106 are arranged in more than one layer, defined herein as columns 108 and rows 110 arranged preferably substantially perpendicular to each adjacent layer. While the wires 106 of columns 108 and rows 110 are in proximity both laterally and vertically, they do not contact each other while in a natural, un-deformed state. The wires 106 are deformed when a pressure is applied to the flexible upper housing segment 126, causing a portion of the rectangular cross-sectioned wires 106 of the upper layer 114 to contact at least a portion of the rectangular cross-sectioned wires 106 of an internal layer 118. The degree of lateral proximity of the wires 106 of the columns 108 and rows 110 defines the sensitivity of the array in its plane. The closer are the layers 108, 110, the higher is the accuracy of the determination of a pressure's position in the "X" and "Y" axes of the plane of the array 100. The degree of vertical proximity of the wires 106 of the columns 108 and rows 110 defines the sensitivity of the array 100 to a pressure and its variance. It is thus deduced that the greater the number of layers 114, 118 and the denser the arrangement of wires 106 of the layers 114, 118; the higher the accuracy of the determination of the force applied and the variance thereof. The wires 106 of the array 114, 118 are multilayer columns 108 and rows 110 such that the greater the pressure exerted, the more wires 106 of columns 108 come into contact with more wires of rows 110. The pressure or pressures upon a bonded ensemble 214 may comprise a single or multiple vertically static forces, or multiple vertically variable forces in a continuous or non-continuous series, each member of which said series of forces may vary from another member of the said series in different locations in any direction of the plane of the said bonded ensemble 214. All wires 106 of the sensor array preferably have vertical flexibility such that, when a pressure is exerted upon the transparent flexible protective layer of the device 212 by a person touching the said transparent layer 212, or placing fingertips thereupon, or writing a signature thereupon the aforesaid flexible lid 126 deflects, causing the arrays flexible lid 126 to enter into physical contact with at least one wire 106 of the uppermost layer 114 of wires 106 of the grid 100, causing at least one wire 106 of at least the uppermost layer 114 of wires to deflect, causing an electrical contact between at least one wire 106 of at least the uppermost layer 114 with at least one wire 106 of at least the next underlying layer 118. Upon release of that pressure, the bonded ensemble 214 and the wires 106 revert to their original non-deflected position.

The arrays case comprises a flexible lid 126, and included within which case is a semi-viscous non-conducting non-adherent liquid 112 or liquid-like material completely surrounding the wire pressure-sensor array 100, the object of which is: (1) to provide some support to the wires in their non-deflected position; (2) to be evacuated from a wire's vertical interstitial volume when a pressure is exerted upon the bonded ensemble, causing at least one wire 106 of at least one layer 114 to come into a deflected position, wherein at least one wire 106 of at least one column 108 contacts at least one wire 106 of at least one row 110; (3) to reoccupy the interstitial volume when the aforesaid pressure is released. It is important that the liquid 112 not adhere to the wires 106, as an adherence would obstruct an electrical contact between the wires 106.

A method by which the read out module 132 derives the electronic signal of a contact between one wire 106 of a column 108 with a wire 106 of a row 110 (or wires 106 of columns 108 with wires 106 of rows 110), and thus senses pressure, the vertical variation thereof as well as the horizontal movement thereof. U.S. Pat. No. 8,006,565 discloses a wire grid device that includes pressure sensors at each intersection of the grid, requires electrodes, and relies on conductance. While a number of electronic means could be utilized with a wire grid to determine pressure, it is preferable that the means does not cause a current flow in the wires, as does the '565 patent, as this will cause a magnetic field to be generated in and around the wires. A magnetic field may cause some undesirable effects, particularly due to the proximity of the wires. Thus, the preferred method of determining a contact between any wire(s) 106 of the disclosed array 100 is by measuring the electric potential across all the wires of all internal layers of wires 118 underlying the uppermost layer 114. The wires 106 of preferably the uppermost layer 114 (be it a column or a row) are electrically interfaced with a power source 130, which, for operational ease, is preferably the power source 130 of the device in which the array is configured. While this is preferably low voltage DC, AC and Full-Wave Rectified AC (FWAC) could also be utilized. Both ends of the wires 106 of the top layer 114 are interfaced with this voltage source, such that there is substantially the identical electric potential at both ends of each of the said wires of the said uppermost layer. Thus, no current will flow in any underlying layer 118 of wires 106 upon an electrical contact having been made between the uppermost layer 114 of wires 106 and at least that inner layer 118 underlying the uppermost layer 114. All other wires 106 of all other layers 118 are interfaced with a read out module 132, which is programmed to determine the electric potential of all wires 106 of all layers 118 under the uppermost layer 114. Any direct or indirect electrical contact between any wire or wires of the uppermost layer with any wire 106 or wires 106 of any column 108 or row 110 of any underlying layer 118 would cause the electric potential of the wire 106 or wires 106 of the uppermost layer 114 to be transferred to the wire 106 or wires 106 of those underlying layer 118 or layers 118, but no current flow (as there is no difference in electric potential at the ends of those wires). As the wires 106 of all columns 108 and all rows 110 have an individual identity, such a potential in a wire 106 or wires 106 of a column 108 or columns 108 or in a wire 106 or wires 106 of a row 110 or rows 110 causes a potential in that or those wires 106, which is measured, and causes a measurement signal to be emitted. The measurement signal determines the identity or identities of the wire 106 or wires 106 of the column 108 or columns 106 and those of a wire 106 or wires 106 of a row 110 or rows 110 that are in electrical contact. Thereby not only is the X-Y position of the pressure in the plane of the array determined, but the force value of the pressure exerted is determined by identifying the layers of wires that are in electrical contact. If the wires 106 of more than one column 108 are in contact with the wires 106 of more than one row 110, forming an area of contact, the said area is resolved to a point by software included within the device or software operated by an attached computing device. The resultant X-Y coordinates and force values are the basis for the calculation of the algorithm of the authorized user template described hereinafter, and also may be transmitted via an electronic interface to a computer CPU (not shown), for further processing.

Although the wires 106 of the wire pressure-sensor array 100 are presented having a square or rectangular cross sectional shape, it is understood that the wires 106 can have any suitable cross sectional shape. It is also understood that the cross sectional shape and size of the wires 106 of the columns 108 may differ from the cross sectional shape and/or size of the wires 106 of the rows 110. The wires of the rows 110 (the longer dimension) preferably have a greater rectangular cross-section than those of the columns 108, in order to diminish sag in the longer dimension of the array 100. A rectangular cross-section (larger horizontally than vertically) is preferred as: (1) this section provides a greater electrical contact area for the wires; (2) there is no advantage for a wire 106 either of a column 108 or of a row 110 to come into contact with a laterally-adjacent wire 106, such that the wires 106 are preferably more flexible vertically than horizontally. Although certainly the wires 106 must be fabricated of a material that is a good conductor of electricity, such as copper, the use of wires 106 fabricated of a different conducting material is possible. Further, the wires 106 of the columns 108 may be fabricated of a different conducting material than the wires 106 of the rows 110. As it is necessary that the wires 106 of columns 108 enter into electrical contact with wires 106 of rows 110, it is understood that the wires 106 are either bare or coated with an electrically conductive coating (not shown).

The wire pressure-sensor array 100 can be integrated into any of a variety of devices, with several exemplary implementations being presented herein.

A first exemplary implementation is an integrated computer touchpad 200, as illustrated in FIGS. 4 through 6 and 9.

The presently disclosed flat electronic input/output device includes a non-removable segmented frame 206 that forms one surface of a hermetically sealed enclosure 202 and defines a cavity 108 there within. The aforesaid flat parallelepiped-shaped housing 120 of the wire array 100 is disposed within the cavity, and its lid is flexibly bonded to a flexible thin-film transistor liquid-crystal display (TFT-LCD) interface 210 or the like, and the said flexible TFT-LCD interface 210 has an overlying transparent protective layer 212 flexibly bonded thereto. In order that the said flexible transparent protective layer 212 does not accumulate dirt and dust, etc., the protective layer 212 has a non-stick, non-adherent coating. The lid 126 of the flat parallelepiped-shaped wire-array housing 120, its overlying TFT-LCD interface 210 and the latter's overlying flexible transparent protective layer 212 preferably have the same flexibility characteristics, and is hereinafter referred to as the bonded ensemble 214. The bonding of the aforesaid flexible transparent protective layer 212 to the aforesaid TFT-LCD interface 210 and the bonding of the said TFT-LCD interface 210 to the aforesaid flexible upper housing segment 126 of the housing 120 of the wire array 100 underlying the latter, is such that they react to a physical pressure, and the release of such pressure as one ensemble. The original shape of the bonded ensemble 214 is that shape which the said ensemble has when no pressure is exerted upon the said ensemble. Upon the release of a pressure, the said bonded ensemble 214 returns to its original shape.

The aforesaid TFT-LCD interface 210 includes an electronic interface (not shown) with a device's CPU (not shown) and also comprises an electronic interface (not shown) with a computer CPU (not shown), such that the said TFT-LCD interface 210 may send and receive electronic signals from the said device's CPU or computer CPU, and visual indicators may be displayed upon the said TFT-LCD interface 210.

A pressure upon the aforesaid flexible transparent protective layer 212, be it by one or more fingers, a writing instrument, or the like, will cause a downward deflection of the aforesaid bonded ensemble 214, causing the aforesaid flexible lid 126 to deflect and evacuate the semi-viscous liquid from around that area of pressure and forcing at least one wire 106 of the uppermost layer 114 of wires 106 downward, thus causing at least one wire 106 of at least one column 108 to contact at least one wire 106 of at least one row 110. The contact point(s), hereinafter referred to as the "pressure-gesture area", may replicate the oval-shapes of one finger (in the case of the touchpad embodiment and the user identity embodiment, wherein the user enters data with a finger) or more than one finger tip or the point of a writing instrument (in the case of the user identity variant). The oval shapes will be resolved by a program in the device's read out module 132 to the central points of that (those) shape(s). The pressure gesture area of the writing instrument, being a point, need not be resolved.

Upon a contact having been made between a wire 106 of a column 108 with a wire 106 of a row 110 due to a pressure having been exerted upon the aforesaid bonded ensemble 214, the point (of a writing instrument) or points (of a signature) or the resolved point(s) (of one or more fingertips), and the movement and variation of pressure thereof in the plane of the aforesaid bonded ensemble, as well as other programmable parameters, are converted into electronic signals. In the computer touchpad embodiment, the said electronic signals will cause the computer's cursor to move upon the display screen or direct some other computer-programmed action. In the user identity embodiment, the said electronic signal(s) are transmitted to a device's CPU (not shown), for further processing or actions and/or converts them into an encrypted algorithm according to a program in the aforesaid device's CPU, for transmission to a secure server for further processing.

The said electronic signal(s) not only define the "X" and "Y" coordinates of the point(s) of pressure on the aforesaid bonded ensemble 214 (the surface location signal), but the said signal may also vary according to the pressure exerted at that those point(s) of pressure (the force signal). The surface location signal(s) and/or the force signal(s) may be singly or serially static (in the case of one or more fingertips, or a choice of a number of symbols). Conversely, there may be movement of the surface location signal combined with a variance of the force signal at any "X" and "Y" coordinates (in the case of a signature), in which case the surface location signal and the force signals are dynamic. If the wires 106 of more than one column 108 are in contact with the wires 106 of more than one row 110, forming a contact area, the said area will be resolved to a point by software in the read out module 132. The dynamic surface location signal and/or force-signals may be programmed to be analog or digital.

It is obvious that each authorized user will exert his or her own "normal" pressure upon the aforesaid bonded ensemble when performing an aforesaid action. While, in the user identity variant of the present disclosure this will cause a larger or smaller pressure gesture area for the fingertips, it is of no consequence as the pressure gesture area is reduced to a central point (as described herein-before). Further, it is not only the total amount of pressure exerted but the variation(s) in the said pressure(s) that will cause variations in the aforesaid electronic signals. Other capabilities of the device will be described with particular reference to the embodiment and to the variant and embodiment.

All variants of the touchpad embodiments of the flat electronic input/output device presently disclosed have the common internal elements shown in the drawings following, and all are programmed to function as a user identity device. As a user identity device requires a display capability, all touchpad embodiments may optionally include a TFT-LCD interface 210 or the like, even though, as a touchpad connected to a computer, they would not require one. All touchpad embodiments are equipped with a dedicated CPU, in order that they may function as a UID even though, as a touchpad connected to a computer, theoretically the computer's CPU could perform that function. However, it is the touchpad that is the registered device, and the authorized user's touchpad may be used anywhere.

All variants of the touchpad embodiment of the flat electronic input/output device presently disclosed are programmed to direct the on-screen motion of the screen pointer (the cursor) and, while being very flat in form-factor they are fully-functional, capable of performing all the functions of current-art mice or touchpads. The cases of all touchpad embodiments of the flat electronic input/output device include the hereinafter-described touchpad control buttons 204 of current art. As in current art, the (non-wireless) touchpad draws its power from the computer to which it is cabled. It is understood that a wireless version would be powered by a portable power source 130.

The housing 120 of each variation of the touchpad embodiments providing functionality of a pointing device includes a non-removable frame comprised of a number of frame segments 206, each segment of which is preferably pressure-sensitive. A pressure upon a frame segment will cause the computer's touchpad to perform a user-defined action, for example: (1) to take no action; (2) to move from one display screen to another, in a configuration wherein the user has a more than one display screen; (3) to move to the corresponding edge of the display screen; (4) to perform the "scroll" function.

The integrated touchpad configuration of the touchpad embodiment provides a flat input/output device, which is integrated into a portable computer, or other computer-like devices (such as cash registers) that currently utilize a touch pad or similar device. Essentially. The integrated computer touchpad 200 provides a fully functional replacement for existing touchpads, and having the same electronic interfaces as the currently known touchpad. The currently known touchpad is a device that is difficult to use, wherein the disclosed improved touchpad provides three (3) decisive user benefits. If a user has humid fingertips, the current-art touch pad is even more difficult to use, wherein such a condition does not impact the functionality of the herein-disclosed pressure-sensitive wire array 100 integrated into a touchpad assembly. While the integrated computer touchpad 200 theoretically would not require a liquid-crystal display, as the computer display 358 is in the same line of sight as the integrated computer touchpad 200 and quite close to it, operational ease of use with the CPU of the integrated computer touchpad make it highly preferable that this variant includes an LCD 210.

The detachable computer touchpad embodiment of the flat input/output device includes a thin elongated segmented case wherein a midsection defines a cavity therein and two end-sections are substantially coplanar and rotateable with respect to the midsection. Each of the end-sections have ends that are pivotally affixed to the midsection such that the end sections are selectively rotateable between a first stored position and a second extended position forming support legs for the segmented case. In this embodiment, a spring-loaded cabled USB male jack or the like is configured in a cavity preferably in an end of the touchpad, which jack is extractable and may be interfaced with a female USB port of a desktop computer, or on either side of a portable computer, such that it may be utilized by either right-handed or left-handed users. When the said male USB jack or the like is interfaced with a female USB port or the like of a computer, software in the touchpad causes a message to be displayed on the computer's screen, requesting the user to choose a right- or left-handed configuration. Upon the choice being made, software sets the touchpad's button controls accordingly. Obviously, the detachable computer touchpad embodiment can also include a wireless capability to communicate with a computer.

As described previously, the mice variants of the present disclosure are operated with a finger's pressure and movement, such that this desktop embodiment of a touchpad is not grasped with a hand, as are all current desktop mice. Thus, its use should eliminate the problems particularly associated with grasping mice, such as carpal tunnel syndrome and other repetitive motion injuries. Rubber-like mats on the ends of its deploy-able legs prevent the touchpad from skidding when in use, and the legs may be folded up to render the touchpad more compact for ease in packing.

Figure 9:
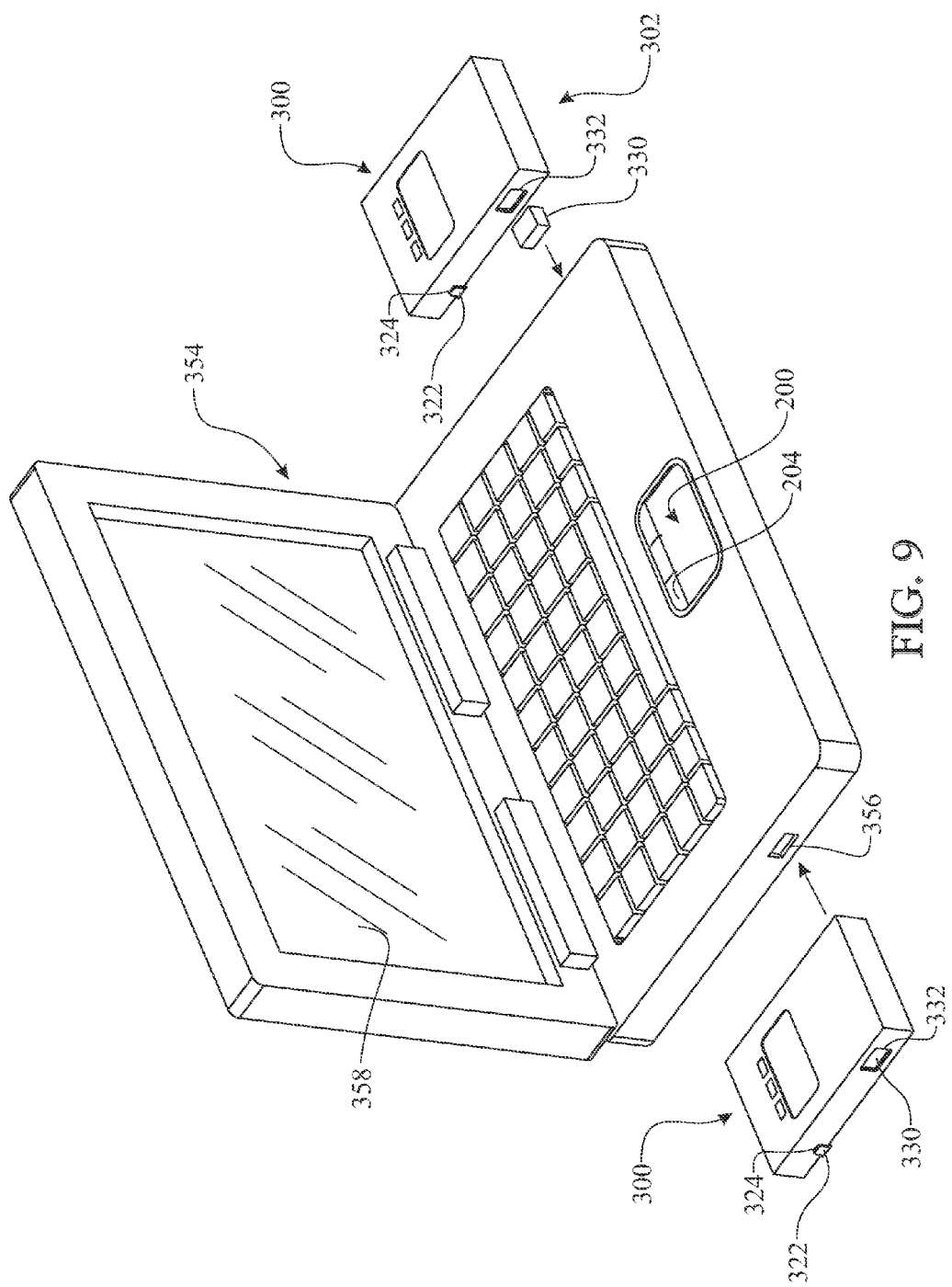
FIG. 9 presents an isometric view of an exemplary portable computer illustrating three optional implementations of a wire grid based touch sensor pointing device, the implementations include an integrated touchpad, a left-handed detachable computer mice, and a right-handed detachable computer mice.
Figure 10:
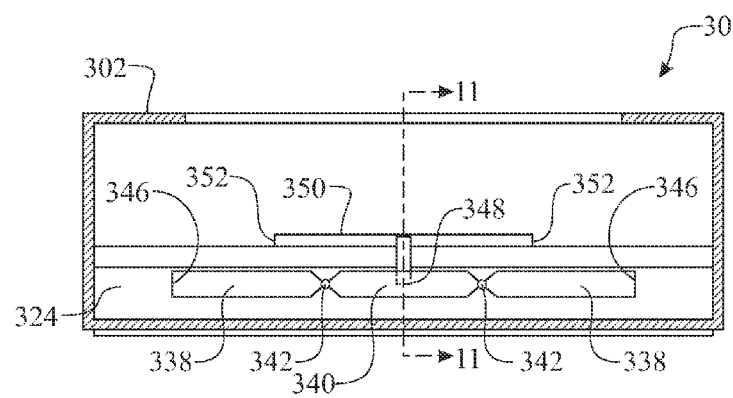
FIG. 10 presents a sectioned side view of the exemplary detachable computer touchpad, the illustration detailing an exemplary slideable slat.
Figure 11:
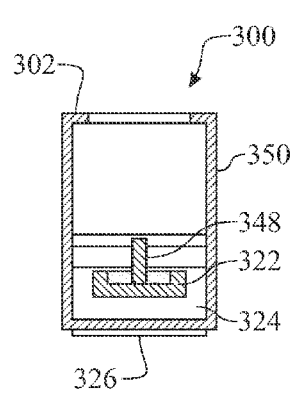
FIG. 11 presents a sectioned end view of the detachable computer touchpad introduced in FIG. 10, wherein the section is taken along section line 11-11 of FIG. 10.
Figure 12:
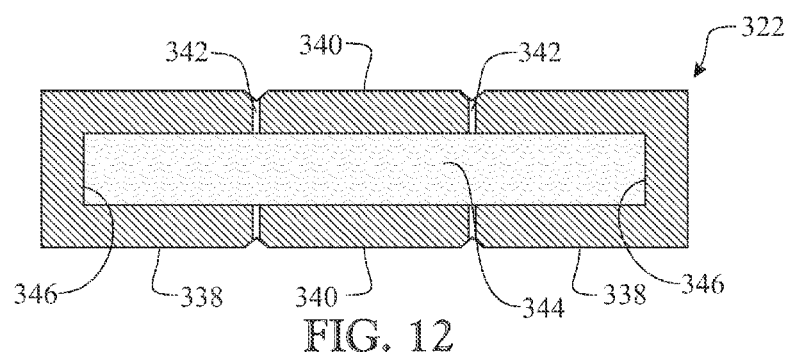
FIG. 12 presents a top view of the slideable slat of the detachable computer touchpad introduced in FIG. 10.

The integrated computer touchpad 200 is integrated into a portable computer 354, in a manner such as the exemplary embodiment presented in FIG. 9. The integrated computer touchpad 200 includes an integrated computer touchpad housing 202 having a framework of integrated computer touchpad frame segments 206. The integrated computer touchpad frame segments 206 are preferably designed to register, secure, retain and protect the various elements assembled within the integrated computer touchpad 200. Operationally, the integrated computer touchpad 200 comprises a variety of user interface elements, including a touchpad section and a series of buttons. The buttons are commonly known programmable digitally operated circuits and are referred to as integrated computer touchpad function controls 204. The integrated computer touchpad function controls 204 can alternatively include a roller wheel, a tilt wheel, and the like. The touchpad section provides an analog operated circuit enabling entry of varying positions and values. The touchpad section would be located within an integrated computer touchpad cavity 208. The touchpad section utilizes the wire pressure-sensor array 100 as the primary operating element to provide the pointing functionality associated with a computer touchpad or mouse. The touchpad section includes the wire pressure-sensor array 100 for receiving and converting an applied pressure into a digital identifier representative of a location reference or a motion reference. The wire pressure-sensor array 100 can be placed within the integrated computer touchpad housing 202 relying upon an air-based insulation. Alternatively, the wire pressure-sensor array 100 can be placed within the parallelepiped-shaped housing 120 (or similar) containing the semi-viscous non-conducting non-adherent liquid 112, providing a liquid-based insulation. An optional integrated computer touchpad liquid crystal display (LCD) interface 210 can be placed upon the flexible upper housing segment 126, wherein pressure applied to the integrated computer touchpad liquid crystal display (LCD) interface 210 would be transferred to the flexible upper housing segment 126, and subsequently transferred to the wire pressure-sensor array 100. An integrated computer touchpad transparent protective layer 212 can be applied to an exposed surface of the integrated computer touchpad liquid crystal display (LCD) interface 210, providing protection thereof. It is understood that in a configuration omitting the parallelepiped-shaped housing 120, any number of elements can provide functionality of the flexible upper housing segment 126. In one example, the integrated computer touchpad liquid crystal display (LCD) interface 210 can be fabricated of a thin-film transistor liquid-crystal display (TFT-LCD) interface. The combination of the integrated computer touchpad liquid crystal display (LCD) interface 210, the integrated computer touchpad transparent protective layer 212, and the flexible upper housing segment 126 form an integrated computer touchpad bonded ensemble 214. It is understood that the integrated computer touchpad bonded ensemble 214 is representative of any formation of a protective surface for the wire pressure-sensor array 100, wherein the integrated computer touchpad bonded ensemble 214 provides a smooth surface for contact with the user and conveyance of pressure to the wire pressure-sensor array 100.

The following describes functionality of the integrated computer touchpad 200 as a pointer device:

The use of the pressure-sensitive frame segments has already been described as being user-programmable. If the user has a multi-screen configuration, a pressure upon a frame segment will move the on-screen cursor to another screen. If the user does not have such a configuration, the segments may be programmed to be continuous scroll, which would be useful in scrolling lengthy documents.

For ease of use of the mice embodiments herein-disclosed, the touchpad's software will establish a proportionality between the dimensions of the computer's display screen and the smaller dimensions of the aforesaid ensemble visible in the cavity of a touchpad. Thereby, a finger's movement upon the herein- before described ensemble is such that the length of a finger's movement will accomplish the proportional movement of the cursor upon the computer's display screen. This proportionality is the method used in current-art desktop-mice, wherein small movements of the touchpad generate larger movements of the cursor. Thus, no significant problem is anticipated for a user to become accustomed to the use of finger movement upon the aforesaid ensemble. As hereinbefore described, the direction of the said movement is determined by the dynamics of the pressure-areas upon the aforesaid ensemble.

The disclosed flat electronic input/output device embodied as a touchpad requires only the motion of the user's finger on the aforesaid bonded ensemble to perform the known touchpad functions. The finger's pressure upon the top plate member or top plate-like member may be exerted in different manners, each pressure-gesture having its particular signification according to the software program for the input device. For example: a one-time pressure-gesture provides a pressure-gesture exerted continuously, combined with a lateral movement of a varying pressure, and a release of the said pressure. The computer program may combine these movement pressure-gestures with the pressures exerted at the points of contact, into actions that have been programmed into the computer.

A user may move the cursor to any position on the display screen by the movement of a finger. A user's action may be a pressure at a single location, or a continuous or varying pressure exerted while moving the finger in any direction. As described hereinbefore, software in the device allows the user to define the function of differing pressures. For example, the aforesaid ensemble may be depressed by the user's finger on its right or left side; such a depression would then be an alternate to the use of the right- or left-handed click buttons on a computer mouse. Depressing the ensemble once or twice on the left side may be programmed to be the equivalent of a corresponding one or two clicks on left function-control button. A corresponding once or twice depression of the right side of the ensemble may be programmed to be the equivalent of a corresponding one or two clicks on right function control button.

The functions of all control buttons of all mice embodiments are identical of those of current-art mice: maintaining the left function control button depressed to move an object, cut, paste, drag and drop, copy, in order to effect that function on text in a document. In the touchpad variant of the present disclosure, finger pressure upon the ensemble performs those same functions. To drag an object, a finger moves the cursor to an object to be dragged whereupon the left side of the ensemble is depressed and, while maintaining downward pressure on the ensemble, the user then moves the cursor with a finger to the onscreen position where the object is to be dropped. Thereupon the pressure on the left side of the ensemble is released, dropping the object. To select text to be deleted, cut and pasted, etc, the user moves the cursor to beginning to the text, depresses the left side of the ensemble, and moves a finger through the text to select the text for the action; thereupon, the text is highlighted and the finger pressure is released but he text remains highlighted. Then, the user presses the right control button or moves the finger to the right side of the ensemble without exerting any pressure, then presses down on the right side to expose the drop-down window. Thereupon, a selection is made from the list presented in the window, by moving the finger to the selection and pressing down upon the right side.

The following describes functionality of the integrated computer touchpad 200 as a user identifier device:

All embodiments of the user identity device (UID) embodiment of the flat electronic input/output device 200 presently disclosed have the common internal elements shown in the drawings, and would be supported by programming directed towards functionality for the user identity device (UID). All UID devices have a dedicated Central Processing Unit (CPU) to perform the functions described herein.

The user identity device 200 may be embodied and programmed, for example, as a stand-alone user identity device for (1) use in a retail or financial establishment; (2) for use in a private location; (3) for use as an access control device. It is understood that for financial applications used in conjunction with credit cards, debit cards, and the like, the flat electronic input/output device 200 would include a card reader. The card reader may be a magnetic card reader, a proximity card reader, and the like. This user identity device (UID) variant allows a user to identify herself or himself as the authorized user, by entering into the device his or her predefined authorized user template for use with a particular card (as described hereinafter). This template may be either (1) the authorized user's signature; (2) a biometric signal, the impression of a preselected number of fingers of one hand (3) any series of predefined alpha, numeric or alphanumeric symbols.

All flat electronic input/output devices programmed as a UID embodiments and their variants include the thin-film transistor liquid-crystal display (TFT-LCD) interface 210, on which the user's signature appears through the flexible transparent protective layer 212 as it is being executed. Other programmed messages, and/or instructions to the user, may also appear on the said TFT-LCD interface 210, as in current signature-pad art. Any authorized user may use the stand-alone embodiment after the authorized user template. In use, the authorized user would simply either (1) write his or her signature in the space that would appear on the TFT-LCD interface 210, or (2) place a number of fingers of a hand in the space that would appear on the TFT-LCD interface 210, in a certain position, and press down normally, or (3) select and enter by means of a finger pressure, in a predefined order, a series of alpha, numeric or alphanumeric symbols from a number of the-such which would appear on the TFT-LCD interface 210. As in current art, messages or instructions would appear on the TFT-LCD interface 210 in the user's language. All UID's may have sound capability, such that the device could verbalize the message on the TFT-LCD interface 210, in the user's language.

The stand-alone embodiment of the user identity device variant for retail use would have an external electronic interface similar to those provided on the currently known implementations, and identifies all persons utilizing a credit card or debit card thereat. While the disclosed user identity device 200 does not require an input pen to complete the electronic circuit, as do current art signature pads and signature recognition pads, the user identity device configured as a stand-alone UID does have a tethered stylus for the user's convenience as a writing instrument when signing, although any writing instrument may be used.

The stand-alone embodiment of the user identity device for private use would include a USB female jack and an RJ45 telephone jack (for those users who have a land-line) and an interface for providing signal communication with mobile devices such as a cell phone (for those users who do not have a land line, or persons desiring to make on-line purchases from their mobile device), and a modem. This device would also be used by those persons having a computer but not desiring to utilize the presently disclosed touchpad. Although the device's TFT-LCD interface 210 is capable of providing visual signals, signal Light Emitting Diodes (LED's) may be configured and programmed on the device. For example, a green LED, which when blinking, indicates sending or receiving and when solid indicates the "ready" state; a red LED which when blinking indicates a problem with the transmission and when solid indicates the "not ready" state, a "problem" state, and the like. This embodiment of the UID draws its power from the low voltage provided by the telephone line. A variant of the stand-alone embodiment is one that is incorporated into a device that accepts payments by credit and debit cards, such as gas pumps.

If the authorized user template is a signature, the device will not only register the two dimensional signature in the "X" and "Y" coordinates, but also the "force signal" at each said coordinate, among other elements that make up the algorithm for the template, among which is the position of the fingers with relation to the frame. If the authorized user template is a number of fingertips, the device's CPU will (1) resolve the pressure-gesture area of the oval shapes of the finger tips to the central point of those shapes; (2) measure the force signal of each finger tip of the group; (3) measure the angular vectors of each central point of the four points; (4) measure the distances between each central point of the finger points; (5) measure the position of the fingers in relation to the frame. It is independent of the condition of the fingertips (clean, dry, and the like); it is the pressure-gesture that is important. If the authorized user's template is a series of alpha, numeric or alphanumeric symbols in a certain order, the device will not only register the series entered, but also the force signal of each entry among other elements that make up the algorithm for the template.

The device's CPU is programmed to compute an algorithm for any of the inputs based upon predefined mathematical formulae, and transmits it to the secure database for comparison with the authorized user template, which is stored in a secure database. Whether the authorized user template is a signature, a series of alpha, numeric or alphanumeric symbols, or fingertips, the same procedure is followed. The device's CPU also includes the device's instruction set (not shown) which not only allows the computation of the algorithm of the authorized user's template based upon the users input data but also, among other instructions and capabilities, provides an update facility, controls the device's visible and sound indicators (such as continue, please wait, calculating, sending, receiving, done, clear, reset, please repeat, authorized, not authorized, canceled, among other visible indicators), that appear on the TFT-LCD interface 210, as required and necessary.

A user identity device 200 may be used as a stand-alone remote user identity device for access control. In this embodiment, the device includes a wireless communication interface (not shown), an external electricity supply (not shown), a built-in rechargeable back-up battery supply, and may include an interface to a locking mechanism (not shown) controlling access to the premises. The device's CPU, in addition to its own instruction set, receives instructions through a computer interface (not shown) or the wireless communication interface (not shown) from the remote computer (not shown) either to authorize entry, in which case it causes that visible indicator to appear on the TFT-LCD interface or the like and thereupon sends the signal to open the locking mechanism (not shown) controlling access to the premises and clear the visible indicators from the TFT-LCD interface or the like; or to deny access, in which case it causes the appropriate visible indicator to appear on the TFT-LCD interface 201 and thereupon clears the visible indicators from the TFT-LCD interface 210.

The security access control device is always in an active stand-by mode when not receiving an input, in the sense that it is always ready to receive a message from the remote computer, or to receive input on the device and thereupon to activate the local mechanisms, and to cause the device to display visible indicators on the TFT-LCD interface 210. The ancillary hardware and software incorporated in the device's CPU are well known in current art, and not part of the present application. When the device 200 is used as a remote user identity device for access control, it could be onerous for the device to be hard wired to the remote computer. Thus, it may be advantageous to have a two-way wireless communication link for transmission of an encrypted algorithm respective of a person desiring entry, to a computer linked to the secure server, and the transmission of the reply. Security considerations of the device are described hereinafter.

In an outdoor remote user identity installation of the security access control device 200 it is understood that, over time and even though the device 200 would be hermetically sealed, the device 200 may require maintenance by authorized personnel, who would open the device only upon having received electronic permission for such action.

The security access control device 200 would be sealed and include internal sensors (not shown) which would record any attempt to open or tramper with it. An unauthorized attempt to access the internal elements of the device 200 will direct the device 200 to send an appropriate signal to the remote computer and cause the chip set in the device's CPU to shut down all operations. Thereupon, only an appropriate signal from the remote computer will allow the device to reset and function. Only authorized personnel may have access to the case and its internal elements.

Method of Defining the Authorized User's Template and Method of Use in a User Identity Device A person desiring to utilize the user identity variant of the flat electronic input/output device 200 must first follow a method to establish an authorized user template identifying them self as an authorized user. This may be done at the institution that issued the credit or debit card, any financial institution that is authorized to perform this service, and the like. The use of an authorized user template is linked to that (or those) particular credit or debit card(s). Its use with debit cards would replace the PIN as input for the user's identity.

Once a user's identity and respective template has been defined and linked to the card, the user may utilize the card with any associated user identity device (UID). More than one authorized users may be linked to a card, each user having a separate authorized user template. A private user having a computer and a presently-disclosed touchpad programmed for use as a UID, or a private user having a private UID, after having created the authorized user template at an authorized institution, would then authenticate his or her computer and touchpad (or private UID) either at the same time, or in an online authentication procedure with the secure server. One authenticated, the touchpad or private UID may be used anywhere for a transaction.

It is obvious that the User Identity Device (UID) and the authorized user's template could be utilized for purposes outside the domains of signature verification and purchase authorization. It could be utilized to authenticate a computer's user in order to utilize a specific program, or to continue to use the program by periodically sampling the user's template. It could be used to establish the identity and/or age of a person desiring to enter a domain, utilize a program, etc. All such applications would require the person to establish an authorized user's template. As described, the user's fingertips are considered to be the most efficient template.

In order to define the authorized user template, a user first creates a trial set, by either selecting one or a combination of templates: (1) his or her signature, by signing a preselected number of times on a line appearing on the TFT-LCD interface 210 of the user identity device 200, or (2) a number of fingers of one of the user's hands, by placing them a number of times onto the UID in a particular position with reference to a frame that appears on the TFT-LCD interface 210; (3) entering a number of times the user's selection, in a certain order, of a series of predefined alpha, numeric or alphanumeric series of symbols that appear on the TFT-LCD interface 210.

Each one of the trial sets of templates is transmitted to a secure server as an algorithm according to an encrypted program in the device's CPU, which algorithms are processed according to secret mathematical formulae and converted into verification algorithms by the said server. Each trial set could contain many thousands of bits, according to the level of security desired by a user. The mathematical method of construction of the verification algorithms of the authorized user's templates from the trial set is such that no one person or group of persons having participated in the method or its construction has total knowledge of it.

Obviously, each one of the raw sets of data of the trial set will have a slight natural variation in the lateral signal, the signal and other predefined parameters. Thus, each one of the trial set will naturally have slightly different values, which is recorded in the database as acceptable mean and outlying values of the algorithms of the authorized user's template registered in a secure database.

The above-described authorized user's template may be defined to a higher level of security, as may be desired by the user. An authorized user may, when defining the authorized user's template, set the program at any desired security level by increasing the number of parameters entered into the algorithm, or by including another type of input into the authorized user's template which is processed to form the algorithm. A signature is already a multidimensional data template, two for the lateral signal and one for the force signal at each "X" and " y" coordinates. This may be increased by including other parameters into the signature template, for example parameters such as speed of execution of a signature, or specific elements of the dynamic of the execution of the signature.

The security of any template comprising any predefined series of user-selected alpha, numeric or alphanumeric symbols or any symbols defined by the authorized user may be increased, for example, by including the speed of selection, the time intervals between selections, and the pressure at selection of each symbol. It would be possible for the authorized user to add another element to the authorized user's template; for example adding some alpha, alphanumeric or numeric symbols before or after signing, or the reverse if the user had selected alpha, alphanumeric or numeric symbols; or adding some alpha, alphanumeric or numeric symbols before or after placing the fingertips on the device, if that were the authorized user's template; or by modifying the outlying values of the template, and allowing only a certain number of attempts before the device refuses any further attempt for the input. Including such parameters could increase the data set by some powers, thus increasing considerably the bit set of the algorithm.

Obviously, the user identity device embodiment and its variants may be used to make a credit card or debit card purchase only after the authorized user template hereinbefore described has been defined. All persons having computers obviously have a pointer device, such as a mouse and/or touchpad, and all touchpads of the present disclosure are programmed as UID's. A person not having a computer but having a TV-USB connection or a telephone could use the disclosed method with a private stand-alone user identity device described hereinbefore, which includes a USB port, and would require the adequate cable. A person having a cell phone having a mini-USB port could also use the private stand-alone user identity device connected to the phone with an adequate cable. Alternatively, the device 200 may include a Bluetooth wireless interface circuit for wirelessly communicating with the cellular telephone, a computer tablet, and the like.

It is preferable that a confirmation template be defined at the time the user defines the authorized user template. While that could be the user's initials, a short series of symbols, and the like it is preferably the user's fingertips. The confirmation template would be requested of the user by the secure server upon a transaction having been initiated. The utilization of the user's fingertips is easier and faster than the signature or symbols, and requires nothing to be committed to memory. Its use will foil any attempt at fraudulent use (described hereinafter). While it is theoretically possible that some authorized users may choose not to use the confirmation procedure, that would possibly cause the user not to be covered by the fraud insurance offered by the card's issuer. At the minimum, the confirmation procedure would be used for important transactions, such as those over a certain money amount or for the authentication of any signature for whatever document.

In use with a stand-alone user identity device 200 configured with a financial card reader, a user wishing to execute a transaction first swipes the financial card (if the device is so equipped) across the reader or enters the card's number by selecting it from the numbers that appear on the TFT-LCD interface 210 of the device 200; the user is then instructed by a message appearing on the TFT-LCD interface 210, to enter the authorized user's template. Generally, a credit card user making a purchase at a retail establishment signs to accept the purchase, and it may be a legal requirement in some jurisdictions that this be the case. Thus, if a signature is required, a line upon with the user is to sign appears on the TFT-LCD interface 210. If the authorized user's template may be other than a signature, then it is preferably the user's fingertips; in this case, a rectangle appears on the TFT-LCD interface 210. If the authorized user's template is a series of symbols, a number of the such appears on the TFT-LCD interface 210, from which number the user selects those in the predefined order of the authorized user's template. In use with a touchpad, a user wishing to execute a transaction first enters the card number on the keypad of the computer, then proceeds to enter the authorized user's template as requested, on the device 200.

The authorized user's template having been entered, the device's CPU (not shown) then calculates an algorithm for that input according to the encrypted program in the device's CPU and transmits it the secure server as an encrypted algorithm. The secure server authenticates the transmitted algorithm by comparison with the verification algorithm. An accepted match between the authorized user's verification algorithm stored in a secure server and a newly received algorithm causes the visible indicator authorized to appear on the TFT-LCD interface 210. A mismatch, or unsuccessful attempts over the predefined number of attempts, an incorrect confirmation entry, no confirmation entry within a certain time lapse, after a certain number of unsuccessful attempts, or the like causes the visible indicator "not authorized' to appear on the TFT-LCD interface 210.

Security Aspects of the Method with the Device

It has been previously mentioned that losses attributed to fraudulent use of credit cards or debit cards (collectively referred to as financial card) amounts to billions of dollars annually. Implementation the user identity device 200 and respective method of use would reduce or eliminate such losses.

One aspect of fraudulent use is that of an attempted use of a lost or stolen financial card at a retail location or a financial institution. Such an attempt could only fail with the device and respective method of use disclosed as, by definition, the unauthorized user, having no knowledge of the authorized user template, could not enter it onto the device upon being requested to do so. Even if the template were known by the unauthorized user, it could not be duplicated at the retail location, as described hereinafter. Such an attempt could proceed no further, and would be canceled by the secure server.

Another aspect of fraudulent use of a lost or stolen financial card is that of an attempted use by a person at a private location, either by telephone or on the Internet using a non-recognized touchpad or a non-recognized private UID. Further the secure server, not recognizing the device as being linked to the card, would flag such an attempt as suspect, and inform the authorized user. In fact, this unauthorized user would certainly know that the authorized user's template linked to the card could not be duplicated, and would not even attempt a fraudulent use of a stolen or surreptitiously gained financial card or the stolen number thereof.

If the unauthorized user did not possess a touchpad variant or a private UID embodiment of the present disclosure and attempted a fraudulent use of a lost or stolen credit or debit card at a private location, either by telephone or on the internet, or at a retail location, that would be, in fact, the current method, open to fraudulent use.

Another aspect of fraudulent use is that wherein an unauthorized user surreptitiously gained access to an authorized user's template and thereupon attempted a transaction, using his or her own touchpad (non recognized) or a private UID (non recognized) at a private location or even using the authorized user's recognized touchpad or private UID, proceeded to (1) forge the user's signature, or trace the signature onto the device, or (2) knowing from which hand are the fingers or how many fingers form the set and in what position on the screen to place the fingers, to secure a photocopy of the user's fingertips and place it onto the ensemble and press it down; or (3) enter the authorized user's alpha, numeric, or alphanumeric symbols.

Even if the authorized user-template were known, it is impossible for such an unauthorized use to duplicate the authorized user's force signals at each "X" and "Y" coordinate of a signature, or to duplicate the period required by the authorized user to execute the signature, or to duplicate the authorized user's natural time intervals between symbol input selections, or to duplicate the force signal of each user-selected input symbol, or to duplicate the many relationships that compose the physical relationships of the user's fingertips and/or the user's natural pressure of each fingertip, such as the relative lengths of a person's fingers, the resolved central point of each finger, as well as the length relationships between them. These features are individual and unique to the individual, such that the algorithm of the user's fingertips is, by definition, different for each person. Indeed, provided that the input template is the authorized user's habitually consistent input, this information is an unconscious behavior pattern, unknown even to the authorized user, such that access to it could not be gained nor could it even be supplied. It will be noted that no element of the user's graphic signature forms part of the authorized user's template; rather, it is a mathematical expression (an algorithm) of the signature. Thus, such an attempt would not proceed beyond the entry of the card data: the secure server would cancel the transaction and would flag such an attempt as suspect, and inform the authorized user.

Another type of fraudulent credit card use or fraudulent user identity remains, to which only a dedicated Information Technology (IT) sophisticated unauthorized user, having advanced equipment at a private location, would have recourse. This type of attempt is that of eavesdropping, interception and recording a transmission from the computer to which the touchpad is interfaced to the secure server, of the encrypted algorithm of the authorized user's template, or the use of a cloned computer to do the same, which methods are commonly known as " hacking". Generally, because of the investment and time involved in such an attempt, this would only be the case if the transaction were an important amount, or the identity were required to be authenticated for an important document. This procedure would be foiled through the use of a confirmation procedure.

Of all the authorized user's transmissions, the hacker would have to know which transmission includes the encrypted algorithm to the secure server, which would be possible but is not an easy task. However, even if an eavesdropper could intercept and record a transmission of the encrypted algorithm sent for verification to the secure server, for later use in an attempted unauthorized use, the inherent safeguard in the trial sets and the use of the confirmation procedure would cause the attempt to fail. In the confirmation procedure, the secure server would request confirmation for the transaction, with the following possibilities resulting: (1) if the authorized user were present at his or her computer or private UID at the time of the request for confirmation of a transaction that he or she did not initiate, the user would know that security had been compromised, and would then cancel the transaction and take further measures with his or her institution. (2) if the authorized user were not present at the time the confirmation was requested, and the hacker retransmitted an authorized user's previously used encrypted algorithms, both for the template and the confirmation, the secure server would automatically refuse the transaction because of the statistical impossibility of any two of the authorized user's algorithms being perfectly identical. As described hereinbefore, natural variations, both in the template and in the confirmation, make such identical algorithms impossible. The authorized user would be informed that his or her security had been compromised. Even if the hacker had general knowledge of the security system, and could modify his or her own device's CPU so that a previously copied authorized user's algorithm could be modified before transmission to the secure server, it would be impossible for the hacker to know what modifications to make so that the secure server would accept the transmission as valid within the acceptable number of attempts.

Finally, the case of duress, in which an authorized user is forced to enter the authorized user's template into a user identity device, and to enter the confirmation template upon request for confirmation. In this scenario, it is probable that the authorized user would be under such stress that the algorithms of the authorized user's template entered to initiate a transaction as well as the confirmation template would be sufficiently different from the normal algorithms, that neither would not be accepted by the secure server within the number of attempts allowed.

Thus, it may be said that no lost or financial card, or fraudulently-gained financial card details could be used with the retail UID for a purchase at a retail establishment, or at a private location using the internet with a touchpad or using a private UID with a telephone, as no unauthorized user could enter the authorized user's template upon being requested to do so. By definition in the fraudulent use of a lost or stolen financial card or the use of fraudulently-gained financial card details, the authorized user would not be present and the unauthorized user could not know the authorized user's template for that card, even imagining that the financial card were not blocked.

It does not appear possible to implement the equivalent inviolable security structure under the current financial card payment system. Even if confirmation passwords could not be forgotten by a user (which the commonly are) and even if such passwords could not be hacked by an unauthorized user (which they commonly are), neither the current retail authorization devices nor (even less so) the devices in private use could accommodate a confirmation method that is inviolable.

A second exemplary implementation is a detachable computer touchpad 300, as illustrated in FIGS. 7 through 13. The exemplary detachable computer touchpad 300 is designed for use with a portable or laptop computer in either a left-handed configuration or a right-handed configuration. The detachable computer touchpad 300 utilizes a detachable computer touchpad case 302 to provide structure and support to the components integrated therewith. One or more detachable computer touchpad frame segments 304 are integrated into the detachable computer touchpad case 302 to support a portion or all of the functional elements as well as provide rigidity and structural support thereto. The exemplary detachable computer touchpad frame segment 304 defines a detachable computer touchpad cavity 306. The wire pressure-sensor array 100 is assembled within the detachable computer touchpad cavity 306 in a similar manner as presented in the integrated computer touchpad 200.

The wire pressure-sensor array 100 can include the integrated computer touchpad bonded ensemble 214 as previously presented. The detachable computer touchpad bonded flexible ensemble 312 includes a detachable computer touchpad LCD interface 308 placed in contacting proximity with the flexible upper housing segment 126. A detachable computer touchpad transparent protective layer 310 is laminated upon an exposed surface of the detachable computer touchpad LCD interface 308 to protect the detachable computer touchpad LCD interface 308 from damage. It is understood that the detachable computer touchpad transparent protective layer 310 may be easily replaceable for servicing. The flexible upper housing segment 126, the detachable computer touchpad LCD interface 308, and the detachable computer touchpad transparent protective layer 310, are collectively referred to as the detachable computer touchpad bonded flexible ensemble 312.

A series of function controls 328 can be integrated into the detachable computer touchpad 300, wherein the function controls 328 provide similar functionality as the integrated computer touchpad function controls 204 previously presented.

The detachable computer touchpad 300 includes a variety of elements for electrical and mechanical interface with the portable computer and/or other consumer electronic devices. One or more extractable male USB jacks 330 can be integrated into the detachable computer touchpad case 302 along either left or right sides. The extractable male USB jacks 330 would be seated within a cavity 332 whereby the extractable male USB jacks 330 can be extracted (as shown in FIG. 9) and reseated as needed. Each connector cable for USB male jack 320 is in electrical communication with other components within the detachable computer touchpad 300 via connector cable 334. This configuration supports left-handed or right-handed user applications. An end male USB jack 314 can be integrated into a top edge of the detachable computer touchpad case 302 to provide additional connectivity options for the user. The end male USB jack 314 would be seated within an end male USB jack cavity 316 whereby the end male USB jack 314 can be extracted and reseated as needed. The end male USB jack 314 is in electrical communication with other components within the detachable computer touchpad 300 via USB male jack connector cable 320. A spring-loaded retracting mechanism 318 can be integrated within the detachable computer touchpad case 302, wherein the spring-loaded retracting mechanism 318 retracts the USB male jack connector cable 320 using a recoiling mechanism.

Figure 13:
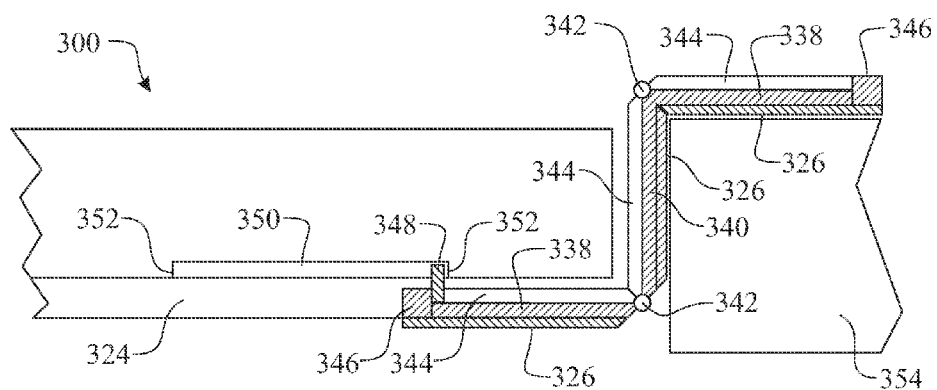
FIG. 13 presents a partially sectioned end view of slideable slat of the detachable computer touchpad introduced in FIG.

A slideable slat 322 is slideably retained within a slideable slat cavity 324. The slideable slat 322 is configured having three segments, a slideable slat middle section 340 flanked by a slideable slat end section 338 pivotally attached to each end of the slideable slat middle section 340 by a slideable slat pivot 342. The mating ends of the segments 340, 338 are formed to enable a predetermined pivotal motion, preferably enabling rotating of approximately 180 degrees. The sliding motion of the slideable slat 322 is governed by a slider control element 348. The slideable slat 322 includes a slideable slat-groove 344 extends inward from an upper surface of the slideable slat 322. The slideable slat-groove 344 spans along a portion of a length of the slideable slat 322, terminating at a slideable slat cavity stop 346 provided at each end thereof. A lower end of the slider control element 348 rests within the slideable slat-groove 344. A slider control cavity 350 is formed within an element of the detachable computer touchpad case 302, wherein the slider control cavity 350 is similar to the slideable slat-groove 344. The slider control cavity 350 extends upwards into the detachable computer touchpad case 302 and spans along a portion of a length of the detachable computer touchpad case 302, terminating at a slider control cavity end stop 352 provided at each end thereof. An upper end of the slider control element 348 rests within the slider control cavity 350. The slider control element 348 limits motion of the slideable slat 322 to a distance between each of the slideable slat cavity stops 346. The sliding motion is extended by the distance between the cavity end stops 352. This configuration enables the user to extend the slideable slat 322 outward from the detachable computer touchpad case 302 to a dimension exposing one of the slideable slat end sections 338 and the entire slideable slat middle section 340 as illustrated in FIG. 13. An anti-skid support contact surface 326 can be disposed upon a contacting surface of the slideable slat 322, wherein the anti-skid support contact surface 326 provides frictional stability to the detachable computer touchpad 300. The slideable slat pivots 342 enable the slideable slat 322 to conform to a shape of a side of the portable computer 354. The slideable slat 322 would be reinserted within the slideable slat cavity 324 for storage. It is understood that the slideable slat 322 would be designed having length that is equal to or shorter than a like dimension of 302. An anti-skid support contact surface 326 is provided along a lower, supporting surface of the slideable slat 322. The anti-skid support contact surface 326 ensures sufficient friction is provided between the slideable slat 322 and the supporting surface or a contacting surface of the portable computer 354.

A plurality of foot pads 336 can be attached to a bottom surface of the detachable computer touchpad case 302. The foot pads 336 are fabricated of a non-slip material such as a rubber, silicone, and the like, wherein the foot pads 336 provide support and act as an anti-slip interface for the detachable computer touchpad 300.

In use, the user would extract the extractable male USB jack 330 from the USB receiving cavity 332 and connect the extractable male USB jack 330 to a respective female USB jack 356 of a portable computer 354. As illustrated in FIG. 9, the detachable computer touchpad 300 is capable of being utilized in both a left-handed configuration and a right-handed configuration. Alternatively, the end male USB jack 314 can be employed for signal connectivity to the portable computer 354 providing for additional options for positioning the detachable computer touchpad 300 while retaining an unencumbered configuration. Although the illustrated embodiments present a wired configuration, it is understood that the detachable computer touchpad 300 can include a wireless signal communication interface.

The detachable computer touchpad of the flat input/output device is a computer touchpad that is configured to interface physically with a female USB port or the like on either side of a portable or laptop computer, such that it may be utilized by either right-handed or left-handed users. Thus it may be utilized with portable computers by persons not wishing to use the integrated touch pad configuration. In this embodiment, the touchpad has USB or the like male jacks configured preferably on both of its sides as "pull/push" mechanisms. The user extracts the male jack from its cavity and interfaces it with a USB female jack on a side of a portable computer. Software in the touchpad recognizes which male jack is interfaced and reconfigures the touchpad's control buttons to either a right- or left-handed user's configuration. When finished, the user extracts the male USB jack from the computer interface and reinserts it into the cavity.

In use as a detachable computer touchpad with a portable or laptop computer, the touchpad must have a physical support on the end opposite the aforesaid USB male jack. In an underside end of the touchpad is situated a cavity including a slide-able slat tightly configured therein, said slat having a groove with end-stops therein and including a number of independently pivot-able sections. The said cavity also includes a slid-able downward-facing projection having a slider in a cavity having end-stops. The slide-able projection interfaces with the aforesaid groove in the said slide-able slat in such manner that one of a number of sections of the slide-able slat is blocked in its cavity when the slide-able slat is extracted to a support position. When the said slide-able slat is extracted to the support position, two sections of the number of sections are pivoted in such manner that one section of the aforesaid number of sections is situated on top of a side of a portable computer, providing support to the end of the detachable computer touchpad.

This detachable computer touchpad also may serve as an ad hoc desktop mouse. A spring-loaded cabled USB male jack or the like is configured in a cavity preferably in an end of the touchpad, which jack may be extracted from the said cavity to be interfaced with a female USB port or the like of a desktop computer or on either side of a portable computer such that it may also be utilized by either right- handed or left-handed users. When interfaced, software in the touchpad causes a message to be displayed on the computer's screen, requesting the user to choose a right- or left-handed configuration. Upon the choice being made, software sets the touchpad's button controls accordingly. In this use, the aforementioned slide-able slat is not deployed from its cavity; it is configured with a rubber-like underside that projects slightly downwardly from the aforementioned cavity, and is an anti-skid device.

A third exemplary implementation is a detachable computer touchpad 400, as illustrated in FIGS. 14 and 15. A majority of the elements of the detachable computer touchpad 400 are similar to like elements of the detachable computer touchpad 300. Like features of the detachable computer touchpad 400 and the detachable computer touchpad 300 are numbered the same except preceded by the numeral '4'. The exemplary detachable computer touchpad 400 is an enhanced version of the detachable computer touchpad 300, wherein the detachable computer touchpad 400 includes a pair of deployable legs 460. Each of the deployable legs 460 is pivotally assembled to a detachable computer touchpad case 402 by a hinge 462. Each deployable leg 460 may be stored in an optional leg storage cavity 470. A ledge 472 is formed into the detachable computer touchpad case 402 to limit the pivotal motion of each deployable leg 460 to a predetermined angle when each deployable leg 460 is rotated and seated against the respective ledge 472. A foot pad 464 can be attached to a supporting end of each deployable leg 460. The foot pads 464 provide support and act as an anti-slip interface for the detachable computer touchpad 400. Although the illustrated design of the foot pads 464 provides a pivotal interface utilizing an integrated feature within the casing to limit the rotation of each deployable leg 460, it is understood that any integrating design can be employed for extending each deployable leg 460 from the detachable computer touchpad case 402 into a supporting configuration and returning each deployable leg 460 against the detachable computer touchpad case 402 into a storage configuration.

Non-Preferred Embodiments

A non-preferred embodiment would only have one pressure-sensitive screen or screen-like member, which would not flex under pressure. While this would obviously perform as does a current- art signature pad and a current-art signature-recognition pad, it would necessarily require a tethered pen as do the current-art signature pads and the current-art signature recognition pads, and it could not function as any other of the herein-described variants of the flat electronic input/output device.

Obviously, the device's frame or its segments may be configured and programmed to include sensors to determine the "X" and "y" coordinates of the finger or a writing instrument upon the transparent protective layer, for example an optical sensor, an infra-red sensors or a radio-frequency sensor, or the like. While the said sensors may provide a more accurate position reading for a writing instrument, such precision is not necessary. Further, any such sensor would not be necessary or useful to resolve the user's fingertips to a central point (described hereinafter). Further still, such sensors are more expensive than the pressure-sensitive configuration of the aforesaid segments of the presently disclosed devices. While the location or locations of the said point or points on the plane of the device may be determined by such means, the pressure exerted and the variation or variations thereof at any point or points cannot be determined by any one of the preceding methods.

For purposes of simplicity, cost and dependability, it is preferred that the flat electronic input/output device herein-described, as well as their variants and embodiments, include no internal moving parts for their functioning as such devices. Obviously, moving parts could be configured therein; however, such inclusion would only serve to render the device more complex, costly and subject to defects and breakdown, for no apparent advantage.

In the foregoing description those skilled in the art will readily appreciate that modifications may be made to the invention without departing from the concepts disclosed herein. Such modifications are to be considered as included in the following claims, unless these claims expressly state otherwise.

What is claimed is:

1. A wire-array pressure sensor comprising:
an array housing comprising a housing base member having a peripheral edge thereof and a series of housing sidewall members contiguous about said peripheral edge of said housing base member and extending upward therefrom forming an interior volume and a flexible upper housing segment spanning across an upper continuous edge formed by said series of housing sidewall members;
a first plurality of segments of electrically conductive wires, said segments of wires spatially arranged parallel to one another forming a first plane of wires, said first plane of wires being located proximate and parallel to said flexible upper housing segment, each electrically conductive wire of said first plurality of segments of electrically conductive wires being individually identified, said first plurality of segments of electrically conductive wires being spatially arranged parallel and below said flexible upper housing segment;
a second plurality of segments of electrically conductive wires, said segments of wires spatially arranged parallel to one another forming a second plane of wires, each electrically conductive wire of said second plurality of segments of electrically conductive wires being individually identified;
wherein said second plane of wires is spatially arranged parallel and below said first plane of wires and said wires of said first plane are non-parallel to said wires of said second plane;
ends of said wires of said first plane of wires are connected to a power source;
ends of said wires of said second plane of wires are connected to a read out module;
wherein in operation, a pressure is applied to a flexible upper housing segment causing said flexible upper housing segment to deflect, said deflection of said flexible upper housing segment deflects a portion of said first plurality of segments of electrically conductive wires of said first plane of wires causing contact between said portion of said first plurality of segments of electrically conductive wires of said first plane and a portion of said second plurality of segments of electrically conductive wires of said second plane, wherein said contact creates an electrical circuit identified by software associated with said read out module, and said software determines each of said locations of contact between said portion of said first plurality of segments of electrically conductive wires of said first plane and a portion of said second plurality of segments of electrically conductive wires of said second plane and provides at least one "X" and "Y" coordinate associated with said contact, wherein no current flows in any underlying layer of wires of said second plurality of segments of electrically conductive wires upon an electrical contact having been made between said uppermost layer of wires of said first plurality of segments of electrically conductive wires and said second plurality of segments of electrically conductive wires, wherein all other wires of said second plurality of segments of electrically conductive wires are interfaced with said read out module, wherein said read out module is programmed to determine an electric potential of all wires of said second plurality of segments of electrically conductive wires, and any direct or indirect electrical contact between any wire or wires of said first plurality of segments of electrically conductive wires with any wire or wires of any column or row of said second plurality of segments of electrically conductive wires would cause said electric potential of said wire or wires of said first plurality of segments of electrically conductive wires to be transferred to said wire or wires of said second plurality of segments of electrically conductive wires.

2. A wire-array pressure sensor as recited in claim 1, further comprising:

a third plurality of segments of electrically conductive wires, said segments of wires spatially arranged parallel to one another forming a third plane of wires, each electrically conductive wire of said third plurality of segments of electrically conductive wires being individually identified;

wherein said third plane of wires is spatially arranged parallel and below said second plane of wires and said wires of said second plane are non-parallel to said wires of said third plane;

ends of said wires of said third plane of wires are connected to said read out module, wherein in operation, said pressure applied to a flexible upper housing segment further causes contact between a smaller portion of said second plurality of segments of electrically conductive wires of said second plane and a respective portion of said third plurality of segments of electrically conductive wires of said third plane, wherein said contact creates an electrical circuit identified by software associated with said read out module, and said software further determines each of said locations of contact between said portion of said second plurality of segments of electrically conductive wires of said second plane and said respective portion of said third plurality of segments of electrically conductive wires of said third plane and provides at least one "X" and "Y" coordinate associated with said contact.

3. A wire-array pressure sensor as recited in claim 2, further comprising:

a volume of semi-viscous non-conducting non-adherent liquid contained within said array housing.

4. A wire-array pressure sensor as recited in claim 2, wherein said wires of said first plane are substantially perpendicular to said wires of said second plane and said wires of said third plane are substantially perpendicular to said wires of said second plane.

5. A wire-array pressure sensor as recited in claim 1, wherein said wires of said first plane are substantially perpendicular to said wires of said second plane.

6. A wire-array pressure sensor as recited in claim 1, further comprising a flexible liquid crystal display, said flexible liquid crystal display being assembled in planar contact with an exposed surface of said flexible upper housing segment.

7. A wire-array pressure sensor as recited in claim 1, further comprising elements of a computer touchpad, including a touchpad housing, a touchpad cavity providing accessing to said flexible upper housing segment, an interface for communicating with computing device, and at least one touchpad function control user entry element.

8. A wire-array pressure sensor comprising:

an array housing comprising a housing base member having a peripheral edge thereof and a series of housing sidewall members contiguous about said peripheral edge of said housing base member and extending upward therefrom forming an interior volume and a flexible upper housing segment spanning across an upper continuous edge formed by said series of housing sidewall members;

a first plurality of segments of electrically conductive wires, each of said first plurality of segments of electrically conductive wires having a rectangular cross sectional shape, said segments of wires spatially arranged parallel to one another forming a first plane of wires, said first plane of wires being located proximate and parallel to said flexible upper housing segment, each electrically conductive wire of said first plurality of segments of electrically conductive wires being individually identified, said first plurality of segments of electrically conductive wires being spatially arranged parallel and below said flexible upper housing segment;

a second plurality of segments of electrically conductive wires, each of said second plurality of segments of electrically conductive wires having a rectangular cross sectional shape, said segments of wires spatially arranged parallel to one another forming a second plane of wires, each electrically conductive wire of said second plurality of segments of electrically conductive wires being individually identified;

wherein said second plane of wires is spatially arranged parallel and below said first plane of wires and said wires of said first plane are non-parallel to said wires of said second plane;

ends of said wires of said first plane of wires are connected to a power source;

ends of said wires of said second plane of wires are connected to a read out module;

wherein in operation, a pressure is applied to a flexible upper housing segment causing said flexible upper housing segment to deflect, said deflection of said flexible upper housing segment deflects a portion of said first plurality of segments of electrically conductive wires of said first plane of wires causing contact between said portion of said first plurality of segments of electrically conductive wires of said first plane and a portion of said second plurality of segments of electrically conductive wires of said second plane, wherein said contact creates an electrical circuit identified by software associated with said read out module, and said software determines each of said locations of contact between said portion of said first plurality of segments of electrically conductive wires of said first plane and a portion of said second plurality of segments of electrically conductive wires of said second plane and provides at least one "X" and "Y" coordinate associated with said contact, wherein no current flows in any underlying layer of wires of said second plurality of segments of electrically conductive wires upon an electrical contact having been made between said uppermost layer of wires of said first plurality of segments of electrically conductive wires and said second plurality of segments of electrically conductive wires, wherein all other wires of said second plurality of segments of electrically conductive wires are interfaced with said read out module, wherein said read out module is programmed to determine an electric potential of all wires of said second plurality of segments of electrically conductive wires, and any direct or indirect electrical contact between any wire or wires of said first plurality of segments of electrically conductive wires with any wire or wires of any column or row of said second plurality of segments of electrically conductive wires would cause said electric potential of said wire or wires of said first plurality of segments of electrically conductive wires to be transferred to said wire or wires of said second plurality of segments of electrically conductive wires.

9. A wire-array pressure sensor as recited in claim 8, further comprising:

a third plurality of segments of electrically conductive wires, said segments of wires spatially arranged parallel to one another forming a third plane of wires, each electrically conductive wire of said third plurality of segments of electrically conductive wires being individually identified;

wherein said third plane of wires is spatially arranged parallel and below said second plane of wires and said wires of said second plane of wires are non-parallel to said wires of said third plane;

ends of said wires of said third plane of wires are connected to said read out module, wherein in operation, said pressure applied to a flexible upper housing segment further causes contact between a smaller portion of said second plurality of segments of electrically conductive wires of said second plane and a respective portion of said third plurality of segments of electrically conductive wires of said third plane, wherein said contact creates an electrical circuit identified by software associated with said read out module, and said software further determines each of said locations of contact between said portion of said second plurality of segments of electrically conductive wires of said second plane and said respective portion of said third plurality of segments of electrically conductive wires of said third plane and provides at least one "X" and "Y" coordinate associated with said contact.

10. A wire-array pressure sensor as recited in claim 9, wherein said wires of said first plane are substantially perpendicular to said wires of said second plane.

11. A wire-array pressure sensor as recited in claim 8, further comprising:

a volume of semi-viscous non-conducting non-adherent liquid contained within said array housing.

12. A wire-array pressure sensor as recited in claim 8, wherein said wires of said first plane are substantially perpendicular to said wires of said second plane.

13. A wire-array pressure sensor as recited in claim 8, further comprising a flexible liquid crystal display, said flexible liquid crystal display being assembled in planar contact with an exposed surface of said flexible upper housing segment.

14. A wire-array pressure sensor as recited in claim 8, further comprising elements of a computer touchpad, including a touchpad housing, a touchpad cavity providing accessing to said flexible upper housing segment, an interface for communicating with computing device, and at least one touchpad function control user entry element.

15. A wire-array pressure sensor comprising:

an array housing comprising a housing base member having a peripheral edge thereof and a series of housing sidewall members contiguous about said peripheral edge of said housing base member and extending upward therefrom forming an interior volume and a flexible upper housing segment spanning across an upper continuous edge formed by said series of housing sidewall members;

a first plurality of segments of electrically conductive wires, said segments of wires spatially arranged parallel to one another forming a first plane of wires, said first plane of wires being located proximate and parallel to said flexible upper housing segment, each electrically conductive wire of said first plurality of segments of electrically conductive wires being individually identified, said first plurality of segments of electrically conductive wires being spatially arranged parallel and below said flexible upper housing segment;

at least one subsequent plurality of segments of electrically conductive wires, said segments of wires spatially arranged parallel to one another forming a respective subsequent plane of wires, each electrically conductive wire of said at least one subsequent plurality of segments of electrically conductive wires being individually identified;

wherein each of said at least one subsequent plane of wires is spatially arranged parallel to and below said first plane of wires and said wires of said first plane are non-parallel to said wires an adjacently located subsequent plane of wires of said subsequent plane and each subsequent plane of wires located therebelow is non-parallel with said wires of each respective adjacently located plane of wires;

ends of said wires of said first plane of wires are connected to a power source;

ends of said wires of each said at least one subsequent plane of wires are connected to a read out module;

wherein in operation, a pressure is applied to a flexible upper housing segment causing said flexible upper housing segment to deflect, said deflection of said flexible upper housing segment deflects a portion of said first plurality of segments of electrically conductive wires of said first plane of wires causing contact between said portion of said first plurality of segments of electrically conductive wires of said first plane and a portion of said adjacently located subsequent plurality of segments of electrically conductive wires of said respective subsequent plane of wires, wherein said contact creates an electrical circuit identified by software associated with said read out module, and said software determines each of said locations of contact between said portion of said first plurality of segments of electrically conductive wires of said first plane and a portion of said subsequent plurality of segments of electrically conductive wires of each of said adjacently located subsequent plane and provides at least one "X" and "Y" coordinate associated with said contact, wherein no current flows in any underlying layer of wires upon an electrical contact having been made between said first plurality of segments of electrically conductive wires and at least an inner layer of said plurality of segments of electrically conductive wires of said at least one subsequent plurality of segments of electrically conductive wires underlying said first plurality of segments of electrically conductive wires, wherein said read out module is programmed to determine an electric potential of all wires of all layers under said first plurality of segments of electrically conductive wires, and any direct or indirect electrical contact between any wire or wires of said first plurality of segments of electrically conductive wires with any wire or wires of any column or row of any of said at least one subsequent plurality of segments of electrically conductive wires underlying said first plurality of segments of electrically conductive wires would cause said electric potential of said wire or wires of said first plurality of segments of electrically conductive wires to be transferred to said wire or wires of those of said at least one subsequent plurality of segments of electrically conductive wires underlying said first plurality of segments of electrically conductive wires.

16. A wire-array pressure sensor as recited in claim 15, further comprising:
   determining a pressure applied to said flexible upper housing segment by determining a depth of contact between portions of two adjacently located subsequent plurality of segments of electrically conductive wires.

17. A wire-array pressure sensor as recited in claim 15, further comprising:
   a volume of semi-viscous non-conducting non-adherent liquid contained within said array housing.

18. A wire-array pressure sensor as recited in claim 15, wherein said wires of said first plane are substantially perpendicular to wires of a second plane, wherein said second plane is defined as an adjacently located one of said at least one subsequent plurality of segments of electrically conductive wires.

19. A wire-array pressure sensor as recited in claim 15, wherein at least a portion of said wires have a rectangular cross sectional shape.

20. A wire-array pressure sensor as recited in claim 15, further comprising a flexible liquid crystal display, said flexible liquid crystal display being assembled in planar contact with an exposed surface of said flexible upper housing segment.

* * * * *